United States Patent
Kizu et al.

(10) Patent No.: US 6,421,308 B1
(45) Date of Patent: Jul. 16, 2002

(54) STATE DETECTING DEVICE AND OPTICAL DISK DEVICE

(75) Inventors: Naoki Kizu; Kazuhiro Sugiyama; Shigeru Matsui; Noboru Yashima; Yukari Hiratsuka, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/241,411

(22) Filed: Feb. 2, 1999

(30) Foreign Application Priority Data

Feb. 3, 1998 (JP) .......................... 10-022113

(51) Int. Cl.[7] ............................................. G11B 20/10
(52) U.S. Cl. ................. 369/53.17; 369/47.22; 369/30.11; 369/30.22
(58) Field of Search .................... 369/275.3, 275.4, 369/53.29, 47.22, 47.54, 30.11, 30.23, 47.49, 53.35, 30.04, 124.03, 53.21, 59.25, 47.28, 47.24, 124.05, 124.07, 30.07, 53.17, 30.22, 30.21

(56) References Cited

U.S. PATENT DOCUMENTS

| | | | | |
|---|---|---|---|---|
| 5,212,677 A | * | 5/1993 | Shimote et al. | 369/53.17 |
| 5,278,815 A | * | 1/1994 | Mashimo et al. | 369/47.21 |
| 5,452,279 A | * | 9/1995 | Yokota et al. | 369/47.24 |
| 5,523,990 A | | 6/1996 | Chiba | 369/47.22 |
| 5,604,727 A | * | 2/1997 | Ishihara | 369/47.28 |
| 5,617,384 A | * | 4/1997 | Yonemitsu et al. | 369/30.04 |
| 5,623,459 A | * | 4/1997 | Iwamura et al. | 369/30.23 |
| 5,666,336 A | * | 9/1997 | Yoshida | 369/30.11 |
| 5,867,474 A | * | 2/1999 | Nagasawa et al. | 369/275.3 |
| 6,038,209 A | * | 3/2000 | Satoh | 369/275.3 |

FOREIGN PATENT DOCUMENTS

| | | |
|---|---|---|
| EP | A2-0420211 | 4/1991 |
| EP | A2-0801382 | 10/1997 |
| EP | A-0880129 | 11/1998 |
| JP | A-1050012 | 2/1998 |
| WO | WO/9729483 A | 8/1999 |

\* cited by examiner

*Primary Examiner*—William Korzuch
*Assistant Examiner*—Kim-Kwok Chu

(57) ABSTRACT

For recording data on and reproducing data from an optical disk of a single spiral land/groove configuration, a header detector detects header regions on the optical disk, a PID error detector judges whether the address information read from the header regions is erroneous, using error detection codes, and detects the number of errors per sector. An error count comparator compares the number of errors per sector with a predetermined value, and a state judging circuit identifies the state of the optical disk device by causing transition to a higher or lower state according to the output of the error count comparator. The recording and reproduction are controlled according to the state thus identified.

17 Claims, 14 Drawing Sheets

FIG.10
PRIOR ART
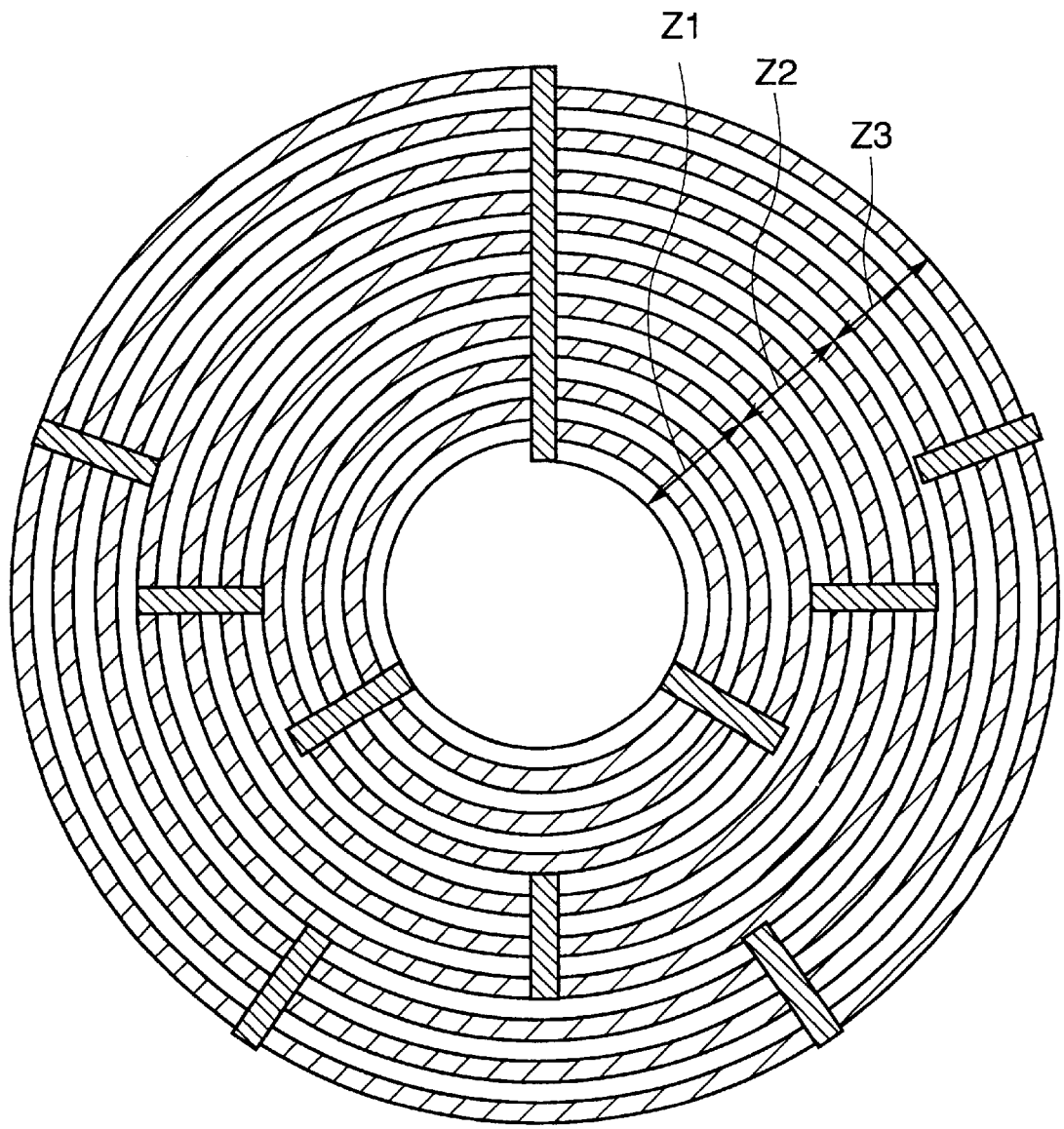
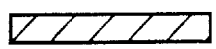 LAND
 GROOVE
 HEADER INFORMATION PART

FIG.14A
PRIOR ART

| CASE NO. | CIC1 | IED1 OK | IED2 OK | PID | RLB1 |
|---|---|---|---|---|---|
| 1 | L | L | L | PID2 | H |
| 2 | L | L | H | PID1 | H |
| 3 | L | H | L | PID2 | H |
| 4 | L | H | H | PID2 | L |
| 5 | H | L | L | PID2 | H |
| 6 | H | L | H | PID1 | H |
| 7 | H | H | L | PID2 | H |
| 8 | H | H | H | PID2 | L(OR H) |

FIG.14B
PRIOR ART

| CASE NO. | CIC2 | IED3 OK | IED4 OK | PID | RLB2 |
|---|---|---|---|---|---|
| 1 | L | L | L | PID4 | H |
| 2 | L | L | H | PID3 | H |
| 3 | L | H | L | PID4 | H |
| 4 | L | H | H | PID4 | L |
| 5 | H | L | L | PID4 | H |
| 6 | H | L | H | PID3 | H |
| 7 | H | H | L | PID4 | H |
| 8 | H | H | H | PID4 | L(OR H) |

STATE DETECTING DEVICE AND OPTICAL DISK DEVICE

BACKGROUND OF THE INVENTION

The present invention relates to an optical disk device in which information is recorded in both of grooves (which sometimes may be abbreviated as "G") and lands (which may be abbreviated as "L") in a spiral form about the axis of rotation of an optical disk which is a recording medium, and reproducing the recorded information, and in particular to a state detection device for detecting the state of an optical disk device based on an error detection code (IED) contained in a header of a recording sector of the optical disk, and an optical disk device using such a state detecting device to achieve recording and reproduction at a higher accuracy.

Recently, a standard of an optical disk (DVD-RAM) adopting a single spiral-land/groove (SS-L/G) recording format has been proposed, in which information is recorded in both of grooves and lands of a disk, in order to increase the recording density, and the land s and grooves are alternated every revolution to form a single continuous recording track. When this standard is adopted, the recording track pitch can be halved, provided that the groove pitch is unchanged, and there is therefore a great contribution to a higher density, and the products adopting this standard are believed to be promising.

The configuration of this optical disk is shown in FIG. 9 and FIG. 10. In the figure, grooves 104 are formed on the disk substrate, with the result that lands 105 are formed between the grooves 104, and a recording film 101 is formed thereon. Recording pits 102 are formed on both of the grooves 104 and lands 105 by a light spot which is scanned by an optical disk device, not shown. As shown in FIG. 10, tracks formed of the grooves 104 and lands 105 are alternated every revolution to form a single continuous recording track.

The optical disk is separated into a plurality of regions called zones (in the illustrated example, three zones Z1, Z2, Z3), and the number of recording sectors per revolution is constant within each zone, and is increased by a certain number, e.g., one, every transition from one zone to a radially outward, adjacent zone.

The track format of this disk is next described. FIGS. 11A and 11B show the configuration of the recording sectors of the optical disk. FIG. 11B is a schematic diagram showing the disposition of identification signals and address values in the recording sectors at a boundary, or connecting points, between lands and grooves. FIG. 11A is a schematic diagram showing the disposition of identification signals and address values in the recording sectors at parts other than the boundary (see ECMA/TC31/97/60).

In the drawings, each of identification information parts forming a header of a recording sector includes four address regions PID (physical ID) containing address information of the recording sector, and is formed of a front part (two PIDs in front) and a rear part (two PIDs at the back), with respect to the order of scanning of the light spot. The front part is shifted radially outward by half a track pitch, and the rear part is shifted radially inward by half a track pitch. In this connection, it is noted that the width of a groove is the same as the width of the land, and half a track pitch equals to the width of the groove. In this way, the front and rear parts are disposed in a staggering manner.

In FIG. 11A and FIG. 11B, it is assumed for the time being that the identification information part consists of PIDs. However, as will be later described with reference to FIG. 12, the identification information part additionally includes a region (VF0) containing information for PLL (phase-locked loop) control, a region (AM) containing synchronization information for address reproduction, and a region (IED) containing error detection codes for detection and correction of errors in the physical address.

The address of a recording sector in a groove is included in the rear part of the identification information part immediately preceding a user information part in the recording sector, and shifted radially inward by half a track pitch from the center of the groove track, while the address of a recording sector in a land is included in the front part of the identification information part immediately preceding the user information part, and shifted radially inward by half a track pitch from the center of the land track (and hence shifted radially outward by half a track pitch from the center of the groove track, which is radially inward of and adjacent to the land track in question).

The identification information is shifted by half a track pitch from the center of the track because this enables the identification information to be shared between a groove track and a land track adjacent to each other, so that the identification information of equal quality can be read whichever of a groove track or a land track is being scanned.

As explained above, FIG. 11B shows the disposition of identification signals at a boundary, and address values represented by the identification signals. As shown in FIG. 10, there is a radially extending boundary line at which groove tracks and land tracks are connected.

The connecting point is detected for example in t he following manner. In a state in which a tracking is achieved, the directions of shifting of the front and rear parts of the identification information part can be detected by referring to the tracking error signal. That is, if the tracking error signal indicates a radially inward tracking error in the front part, and then a radially outward tracking error in the rear part (which means that the front part of the identification information part is deviated radially outward and the rear part is deviated radially inward with reference to the scanning light spot), then the light spot is recognized as scanning a groove track. In contrast, if the tracking error signal indicates a radially outward tracking error in the front part, and then a radially inward tracking error in the rear part (which means that the front part is deviated radially inward and the rear part is deviated radially outward with reference to the scanning light spot), then the light spot is recognized as scanning a land track.

The address read from the identification information part is related to each sector in the following manner. That is, the rear part of the identification information part shifted radially inward by half a track pitch contains the address of a sector (groove sector) in a groove track, and the front part of the identification information part shifted radially outward by half a track pitch contains the address of a sector (land sector) in a land track.

An optical disk device which records and reproduces information in and from an optical disk of the above described configuration judges which of a groove track and a land track is being scanned on the basis of the tracking error signal, and recognizes the information obtained from the rear part of the identification signal as the address of the sector when a groove track is judged to be scanned, and recognizes the information obtained from the front part of the identification signal as the address of the sector when a land track is judged to be scanned.

FIG. 12 shows details of the identification information part. The identification information part is comprised of header regions H1–H4. Each of the header regions H1 to H4 includes a VFO, AM (address mark regions), PID (address region), and IED (address error detection region), and PA (post-amble region). The VFO, AM, PID, IED, and PA are associated with suffixes 1 to 4, depending on which of the four header regions H1 to H4, they belong to. The reference marks VFO, AM, PID, IED, and PA are used not only for denoting the regions, but also the information or signals read from the respective regions.

The VFO is a region of a single frequency pattern used for generation of a synchronous clock and detection timing signals during reproduction. These are used in pull-in operation of a PLL which generates read channel bit clock used during reproduction of signals. The AM is used for reading data in the header region, and is detected by pattern matching of a unique channel bit pattern of the AM, and is used for generation of timing signals, and identification of the boundary between bytes.

The PID contains the address information of the recording sector, the sector information (indicating the order within the four PIDs, i.e., which of the four PIDs the PID in question is, or indicating whether the sector is at the head of a track, or at the end of a track). The IED is appended to the PID for detecting any error in the PID having been read. The PID and IED are modulated, and the PA indicates the end of the modulation.

In the DVD-RAM, four address regions PID1 to PID4 are provided. Each of the address regions PID1 and PID2 contains the address of the recording sector in the groove track. That is, the same address is written repeatedly or in duplication. Each of the address regions PID3 and PID4 contains the address of the recording sector in the land track. That is, the same address is written repeatedly or in duplication.

As shown in FIG. 11A and FIG. 11B, the PID1 and PID2 are shifted radially outward from the center of the groove track by about p/2 (p being the track pitch), and the PID3 and PID4 are shifted radially inward from the center of the groove track by about p/2.

FIG. 13 shows part of an optical disk device for identifying the PID for the recording sector being scanned.

In FIG. 13, PID1 to PID4 denote the signals indicating the address values read from the respective PID regions (also denoted by PID1 to PID4). IED10K to IED40K indicate the result of the error correction detection by means of the signals IED1 to IED4.

A coincidence judgment circuit 106 determines whether PID1 and PID2 input thereto are identical with each other. A coincidence judgment circuit 107 determines whether PID3 and PID4 input thereto are identical with each other. When information is recorded or reproduced from an optical disk in which the address arrangement is as shown in FIG. 11A and FIG. 11B, the addresses PID1 and PID2 which are the addresses of the same groove sector written in duplication, should be identical if they are read correctly. The coincidence judgment circuit 106 ascertains this. The addresses PID3 and PID4 which are the addresses of the same land sector written in duplication, should be identical if they are read correctly. The coincidence judgment circuit 107 ascertains this.

If however the PID1 and PID2 are not read correctly, it is necessary to find which of PID1 and PID2 is correct, or substitute an address value when neither of PID1 and PID2 seems correct or is reliable. Similarly, if the PID3 and PID4 are not read correctly, it is necessary to find which of PID3 and PID4 is correct, or substitute an address value when neither of PID3 and PID4 seems correct or is reliable.

A PID selector 108 selects one of PID1 and PID2, according to its judgment on which of PID1 and PID2 is correct or more reliable, based on IED10K and IED10K, and outputs the selected one of PID1 and PID2 as well as a reliability signal RLB1 indicating the reliability (as to the correctness) of the selected output. This judgment is made using a judgment table 203. FIG. 14A shows the manner of selection between PID1 and PID2.

In FIG. 14A, "H" in column CIC1 indicates that PID1 and PID2 have been found identical, while "L" in column CIC1 indicates PID1 and PID2 have not been found identical. "L" in column IED10K indicates IED10K is true, while "H" in column IED10K indicates IED10K is not true. "L" in column IED20K indicates IED20K is true, while "H" in column IED20K indicates IED20K is not true. "H" in column RLB1 indicates that the value of the selected PID is reliable, while "L" in column RLB1 indicates that the value of the selected PID is not reliable.

When the coincidence signal CIC1 from the coincidence judgment circuit 106 is at "H" indicating that PID1 and PID2 are identical (cases Nos. 5 to 8), either of PID1 and PID2 may be selected. In the table shown in FIG. 14A, PID2 is selected. This applies regardless of either of IED10K and IED20K is at "H" indicating that PID1 or PID2 has not been correctly read (cases Nos. 6 to 8).

When the coincidence signal CIC1 from the coincidence judgment circuit 106 is at "L" indicating that PID1 and PID2 are not equal (cases Nos. 1 to 4), if IED10K is at "L"indicating that the PID1 has been read correctly (case No. 2), PID1 is selected, while if IED20K is at "L" indicating that the PID2 has been read correctly (case No. 3), PID2 is selected. If IED10K and IED20K are both at "L" (case No. 1) or both at "H" (case No. 4), either of PID1 and PID2 is selected. In the table shown in FIG. 14A, PID2 is output.

The reason why the PID2 is selected in such a case is that the likelihood of PID2 being correct is higher because the re-synchronization is initiated at the beginning of each identification information area, and there is a longer time for stabilization after the initiation of the re-synchronization before PID2 appears than before PID1 appears.

When IED10K and IED20K are both at "H" indicating that neither of PID1 and PID2 have been correctly read (cases Nos. 4 and 8), the reliability signal RLB1 is at "L" indicating that the reliability is low. In other cases, the reliability signal RLB1 is at "H" indicating that the reliability is high.

In an alternative arrangement, the reliability signal RLB1 is at "H" only when IED10K and IED20K are both at "H" and the coincidence signal CIC1 is at "H" indicating that PID1 and PID2 are not equal (case No. 4), and the reliability signal RLB1 is at "L" when the coincidence signal CIC1 from the coincidence judgment circuit 106 is at "L" (case No. 8).

A PID selector 109 selects one of PID3 and PID4, according to its judgment on which of PID3 and PID4 is correct or more reliable, based on IED30K and IED40K, and outputs the selected one of PID3 and PID4 as well as a reliability signal RLB2 indicating the reliability (as to the correctness) of the selected output. This judgment is made using a judgment table 204. FIG. 14B shows the manner of selection between PID3 and PID3.

In FIG. 14B, "H" in column CIC2 indicates that PID3 and PID4 have been found identical, while "L" in column CIC2 indicates PID3 and PID4 have not been found identical. "L" in column IED30K indicates IED30K is true, while "H" in column IED30K indicates IED30K is not true. "L" in column IED40K indicates IED40K is true, while "H" in column IED40K indicates IED40K is not true. "H" in column RLB2 indicates that the value of the selected PID is reliable, while "L" in column RLB2 indicates that the value of the selected PID is not reliable.

The operation of the PID selector 109 is shown in FIG. 14B, and is similar to that of the PID selector 108 except that PID1, PID2, IED10K, IED20K, CIC1, and RLB1 are replaced by PID3, PID4, IED30K, IED40K and CIC2, and RLB2, respectively.

A sector address selector 110 receives two signals (selected PID and reliability signals RLB1) from the PID selector 108, and two signals (selected PID (PID3 or PID4) and reliability signal RLB2) from the PID selector 109, as well as a sector number signal N, and a land/groove signal L/G, and selectively outputs a sector address.

The sector number signal N indicates the number N of sectors per track and is supplied from an MPU (microprocessor) forming part of a system controller, not shown, which controls the entire optical disk device, and manages the number of sectors per track.

The land/groove signal L/G indicates whether the track being scanned is a groove track or a land track, and is produced based on the result of detection as to the direction of shift of the front and rear pars of the identification information area with respect to the center of the track, i.e., with respect to the light spot in a state in which the tracking is established.

Let us first assume that the track being scanned is known to be a groove track, according to the land/groove signal L/G. When the reliability signal RLB2 is at "H"indicating that the output of the PID selector 109 is reliable, the sector address selector 110 selects the output of the PID selector 109 as the address of the groove sector. When the reliability signal RLB2 is at "L" indicating that the output of the PID selector 109 is not reliable, and the reliability signal RLB1 is at "H" indicating that the output of the PID selector 108 is reliable, the sector address selector 110 subtracts the number N of sectors per track from the output of the PID selector 108, and outputs the difference (the result of the subtraction) as the address of the groove sector.

When the reliability signals RLB1 and RLB2 are both at "L", a substitute sector is used.

Let us next assume that the track being scanned is known to be a land track, according to the land/groove signal L/G. When the reliability signal RLB1 is at "H" indicating that the output of the PID selector 108 is reliable, the sector address selector 110 selects the output of the PID selector 108 as the address of the land sector. When the reliability signal RLB1 is at "L" indicating that the output of the PID selector 108 is not reliable, and the reliability signal RLB2 is at "H" indicating that the output of the PID selector 109 is reliable, the sector address selector 110 adds the number N of sectors per track to the output of the PID selector 109, and outputs the sum (the result of the addition) as the address of the land sector. When the reliability signals RLB1 and RLB2 are both at "L", then a substitute sector is used.

When the above described method is adopted, if at least one of the four PIDs is correctly read, the address of the sector being scanned can be identified correctly. However, it is necessary to provide a circuit which performs the subtraction of the number N of sectors. This means that the size of the circuit, or the number of gates, is increased. Moreover, it is necessary to ensure that the correct number N of the sectors per track be supplied.

In the optical disk device described above, the timing of starting, such as a timing at which recording is started, or a timing at which reproduction is started is determined based on the state of the detected synchronous signal or the state of the error correction code in the reproduced signal.

In such an arrangement, in the event of a disturbance from outside of the optical disk device, an erroneous judgment that the starting is not possible may be made when in fact it is possible, or an erroneous judgment that the starting is possible may be made when in fact it is not possible. This makes it difficult to improve the accuracy at which information is recorded or reproduced.

Another problem associated with the conventional optical disk device relates to gate (window) signals. Various gate signals are used for setting timings for recording, for extracting only headers from the reproduced data, or for removing headers from the reproduced data, and various other purposes. The gate signals are generated based on addresses read from the headers. But because the addresses read from the headers are not necessarily reliable when the optical disk device has just been started, the gate signals are not obtained at a high accuracy.

SUMMARY OF THE INVENTION

The present invention has been made to solve the problems described above, and its object is to provide a state detection device for detecting the state of the optical disk device at a high accuracy, and an optical disk device which can record information on and reproduce information from an optical disk of an SS-L/G format.

According to one aspect of the invention, there is provided a state detecting device for detecting a state of an optical disk device recording data in and reproducing data from an optical disk having a header information part for each sector, each header information part including a plurality of header regions each including an address region for holding address information, and address error detection region for holding an address error detection code for detecting an error in the address information read from the address region;

said state detecting device comprising:
   header detecting means for detecting the header regions;
   error detecting means for judging whether or not the error detection code read from the address error detection region included in the detected header region indicates an error in the address information read from the address region, and holding the number of errors for one sector;
   error count comparing means for comparing the number of errors held in the error detecting means with a predetermined number; and
   state judging means responsive to the output of the error count comparing means for causing transition to a higher or lower state, to thereby identify the state of the optical disk device.

With the above arrangement, recording and reproduction can be performed according to the state of the optical disk device, and hence more properly and with a higher accuracy.

The state judging means may be configured to cause transition to a higher state when the number of errors held in the error detecting means is not more than the predetermined value and causes transition to a lower state when the number of errors held in the error detecting means is more than the predetermined value.

The "predetermined value" used for comparison with the number of errors can be set taking account of the characteristics of the optical disk device, and the accuracy required of the optical disk device can be obtained with ease.

The state judging means may be configured to cause transition to a lower state when the number of errors held in the error detecting means continues to be more than the predetermined value for a predetermined number of sectors.

With the above arrangement, recording and reproduction can be achieved properly according to the characteristics of the optical disk.

The header detecting means may be configured to detect the header regions using a first header detection window generated based on the address information, or a second header detection window generated based on a header position detection signal indicating the arrangement of the plurality of header regions contained in one sector.

With the above arrangement, the manner of detecting the header regions which is associated with less errors can be selected according to the state of the optical disk device.

The header detecting means may be configured to detect the header regions using the first header detection window when the optical disk device is in or above a predetermined state, and detect the header regions using the second header detection window when the optical disk device is below the predetermined state.

According to another aspect of the invention, there is provided an optical disk device recording data in and reproducing data from an optical disk having a header information part for each sector, each header information part including a plurality of header regions each including an address region for holding address information and an address error detection region for holding an address error detection code for detecting an error in the address information read from the address region, comprising:

an optical head for writing data on and reading data from an optical disk device;
  header detecting means for detecting the header region from the data read by the optical head;
  header detecting means for detecting the header regions from the data read by the optical head;
  error detecting means for judging whether or not the error detection code read from the address error detection region included in the detected header region indicates an error in the address information read from the address region, and holding the number of errors for one sector;
  error count comparing means for comparing the number of errors held in the error detecting means with a predetermined number;
  state judging means responsive to the output of the error count comparing means for causing transition to a higher or lower state, to thereby identify the state of the optical disk device; and
  control means for controlling the recording and reproducing operation of the optical disk device in accordance with the result of the judgment by the state judging means.

With the above arrangement, the control over operation of the optical disk device can be made properly according to the state of the optical disk device.

The control means may be configured to permit recording of data from the optical disk when the optical disk device is in or above a predetermined state, and prohibit the recording and reproduction when the optical disk device is below said predetermined state.

With the above arrangement, recording and reproduction can be achieved with a high accuracy, and in particular erroneous overwriting, during recording, can be avoided.

The state judging means may be configured to cause transition to a lower state when the number of errors held in the error detecting means continues to be more than the predetermined value for a predetermined number of sectors.

With the above arrangement, recording and reproduction can be achieved properly according to the characteristics of the optical disk.

The header detecting means may be configured to detect the header regions using a first header detection window generated based on the address information, or a second header detection window generated based on a header position detection signal indicating the arrangement of the plurality of header regions contained in one sector.

With the above arrangement, the manner of detecting the header regions which is associated with less errors can be selected according to the state of the optical disk device.

The header detecting means may be configured to detect the header regions using the first header detection window when the optical disk device is in or above a predetermined state, and detect the header regions using the second header detection window when the optical disk device is below the predetermined state.

With the above arrangement, errors in detecting the header regions can be reduced even when the optical disk device has just been started, or when the address information cannot be obtained stably for some other reason.

According to a further aspect of the invention, there is provided an optical disk device for recording data in and reproducing data from an optical disk having a header information part for each sector, the header information part including a plurality of header regions, a front part of the header information part being shifted from the center of a track by half a track pitch in one of a radially inward and radially outward directions, and a rear part of the header information part being shifted from the center of a track by half a track pitch in the other of a radially inward and radially outward directions, the optical disk device comprising:
    an optical head forming a light spot for writing data in and reading data from an optical disk;
    an analog signal processor responsive to the output of the optical head for producing a reproduced signal and a tracking error signal;
    address signal generating means for generating address information indicating the position within the sector based on the output of the analog signal processor at the time when the light spot passes the header regions on the optical disk; and
    window generating means responsive to the address information indicating the position within the sector, for generating a detection window signal or a timing signal.

With the above arrangement, detection windows (gate signals) and timing signals of high accuracy can be produced.

According to a further aspect of the invention, there is provided an optical disk device recording data in and reproducing data from an optical disk having a header information part for each sector, each header information part including a plurality of header regions each including an address region for holding address information and an address error detection region for holding an address error detection code for detecting an error in the address information read from the address region; a front part of the header information part being shifted from the center of a track by half a track pitch in one of a radially inward and radially outward directions, and a rear part of the header information part being shifted from the center of a track by half a track pitch in the other of a radially inward and radially outward directions, an optical head for forming a light spot for writing data on and reading data from the optical disk;

header detecting means for detecting header regions from the data read by the optical head;

error detecting means for detecting any error present in the address information having been read, based on an error detection code contained in the header region detected; and window generating means for generating a window signal or a timing signal based on the address information indicating the position within the sector, when it is found by the error detecting means that the address information have been correctly read.

With the above arrangement, detection windows (gate signals) and timing signals which are satisfactory for practical purposes can be obtained even when the optical disk device has just been started, or when the address information cannot be obtained stably for some other reason.

According to a further aspect of the invention, there is provided an optical disk device recording data in and reproducing data from an optical disk having a header information part for each sector, each header information part including a plurality of header regions each including an address region for holding address information and an address error detection region for holding an address error detection code for detecting an error in the address information read from the address region; a front part of said header information part being shifted from the center of a track by half a track pitch in one of a radially inward and radially outward directions, and a rear part of said header information part being shifted from the center of a track by half a track pitch in the other of a radially inward and radially outward directions, comprising:

an optical head for forming a light spot for writing data on and reading data from an optical disk;

an analog signal processor responsive to the output of the optical head for producing a reproduced signal and a tracking error signal;

header detecting means for detecting the header regions from the data read by the optical head;

error detecting means for judging whether or not the error detection code read from the address error detection region included in the detected header region indicates an error in the address information read from the address region, and holding the number of errors for one sector;

error count comparing means for comparing the number of errors held in the error detecting means with a predetermined number;

state judging means responsive to the output of the error count comparing means for causing transition to a higher or lower state, to thereby identify the state of the optical disk device; and window generating means for generating a detection window signal or a timing signal based on the address information contained in the header region detected, when the result of judgment by the state judging means indicates that the optical disk device is in or above a predetermined state, and for generating a detection window signal or a timing signal based on address information which indicates the position within the sector and is generated based on the output of the optical analog signal processor at the time when the light spot passes the header region, when the result of judgment by the state judging means indicates that the optical disk device is below the predetermined state.

With the above arrangement, detection windows (gate signals) and timing signal which are satisfactory for practical purposes can be obtained even when the optical disk device has just been started, or when the address information cannot be obtained stably for some other reason. On the other hand, when the address information can be reproduced stably from the header regions, detection windows (gate signals) and timing signals of high accuracy can be used. Thus, whatever the state of the optical disk device is, the detection windows (gate signals) and timing signals which are more suitable to the state of the optical disk device can be generated.

The header detecting means may be configured to detect said header regions using a header detection window generated by the window generating means.

With the above arrangement, whatever the state of the optical disk device is, the detection windows (gate signals) and timing signals which are more suitable to the state of the optical disk device can be generated.

BRIEF DESCRIPTION OF THE DRAWINGS

In the accompanying drawings:

FIG. 10 is a diagram showing the tracks on the optical disk shown in FIG. 9;

FIG. 14A and FIG. 14B are diagrams showing the operation of the sector address reading section, in particular, the PID selector, in the conventional optical disk device.

DETAILED DESCRIPTION OF THE PREFERRED EMBODIMENTS

Embodiments of the invention will now be described with reference to the drawings.
Embodiment 1

Figure 1:
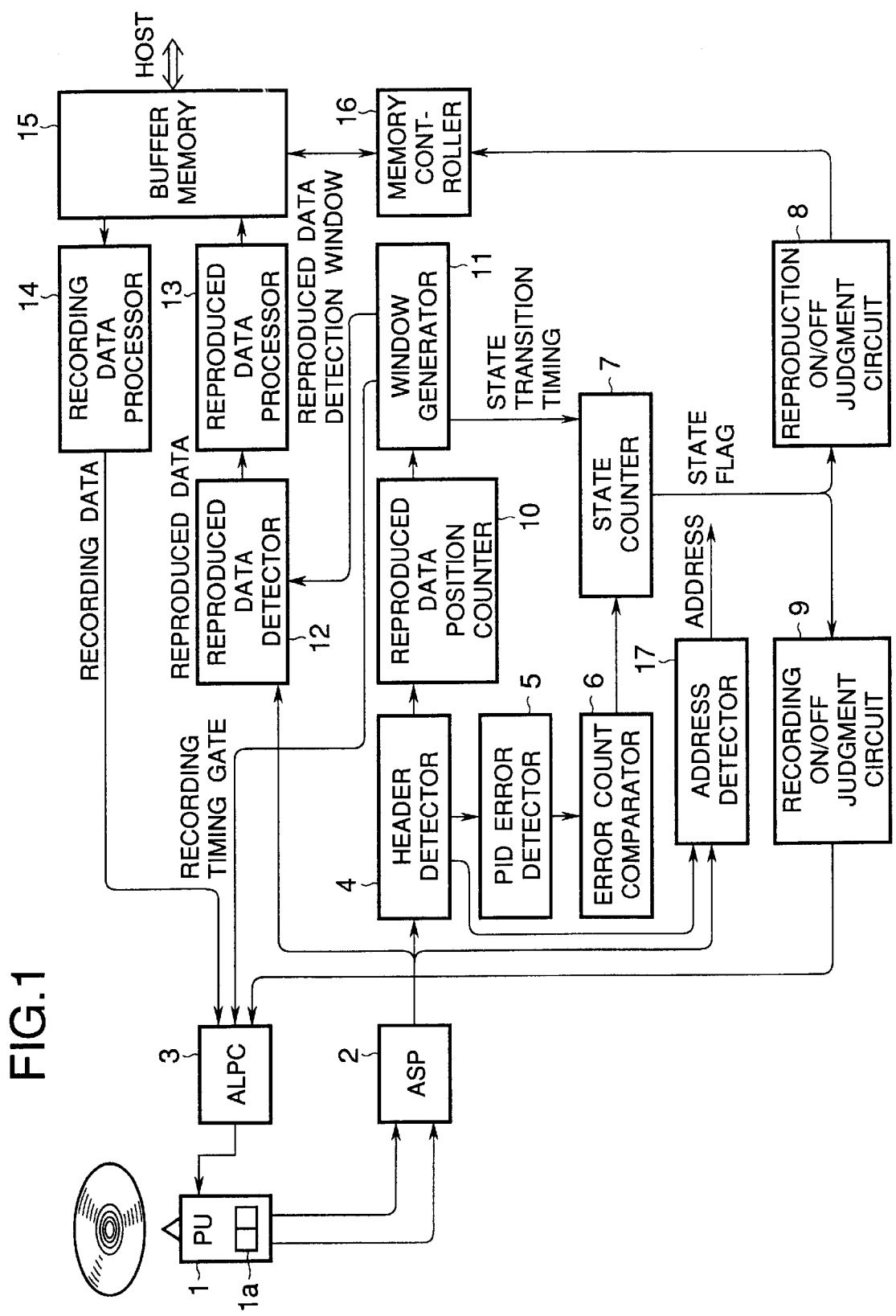
FIG. 1 is a block diagram showing the configuration of an optical disk device of Embodiment 1 of the present invention.

FIG. 1 is a block diagram showing the overall configuration of an optical disk device of Embodiment 1 of the invention. In the drawing, an optical pickup (optical head) 1 is for optically recording data on an optical disk, and optically reproducing data from the optical disk.

The pickup 1 includes an optical detector 1a which in the illustrated example is divided into two parts which are disposed on opposite sides (radially outward and radially inward sides) of a track tangential line in the projected far-field pattern. In this connection, the optical system for passing the light beam from a light source, not shown as such, in the pickup 1 to the surface of the optical disk 100, and passing the light reflected at the surface of the optical disk to the optical detector 1a is so designed that the center of the far field pattern of the information pits on the optical disk is formed at the boundary between the two parts of the optical detector.

An ASP (analog signal processor) 2 receives the two signals from the split-optical detector, and determines the sum of the two signals to produce a reproduced signal, and determines the difference between the two signals to produce a tracking error signal.

The ASP 2 further amplifies the reproduced signal from the optical pickup 1, and binarizes the signal at a predetermined slice level. An ALPC (auto laser power controller) 3 is for controlling the laser power during recording. A header detector 4 is for extracting headers from the reproduced signal processed at the ASP 2.

A PID error detector 5 receives PIDs and IEDs from the header detector 4, and judges whether the PIDs have been correctly read, using the IEDs, and stores the results of the judgment.

An error count comparator 6 counts the number of errors stored in the PID detector 5, and compares the number of errors per sector with a predetermined value.

A state counter 7 forms a state judgment circuit for judging the state of the optical disk device on the basis of the output of the error count comparator 6 in a manner described below.

Reference numeral 8 denotes a reproduction on/off judgment circuit, 9 denotes recording on/off judgment circuit.

Figure 12:
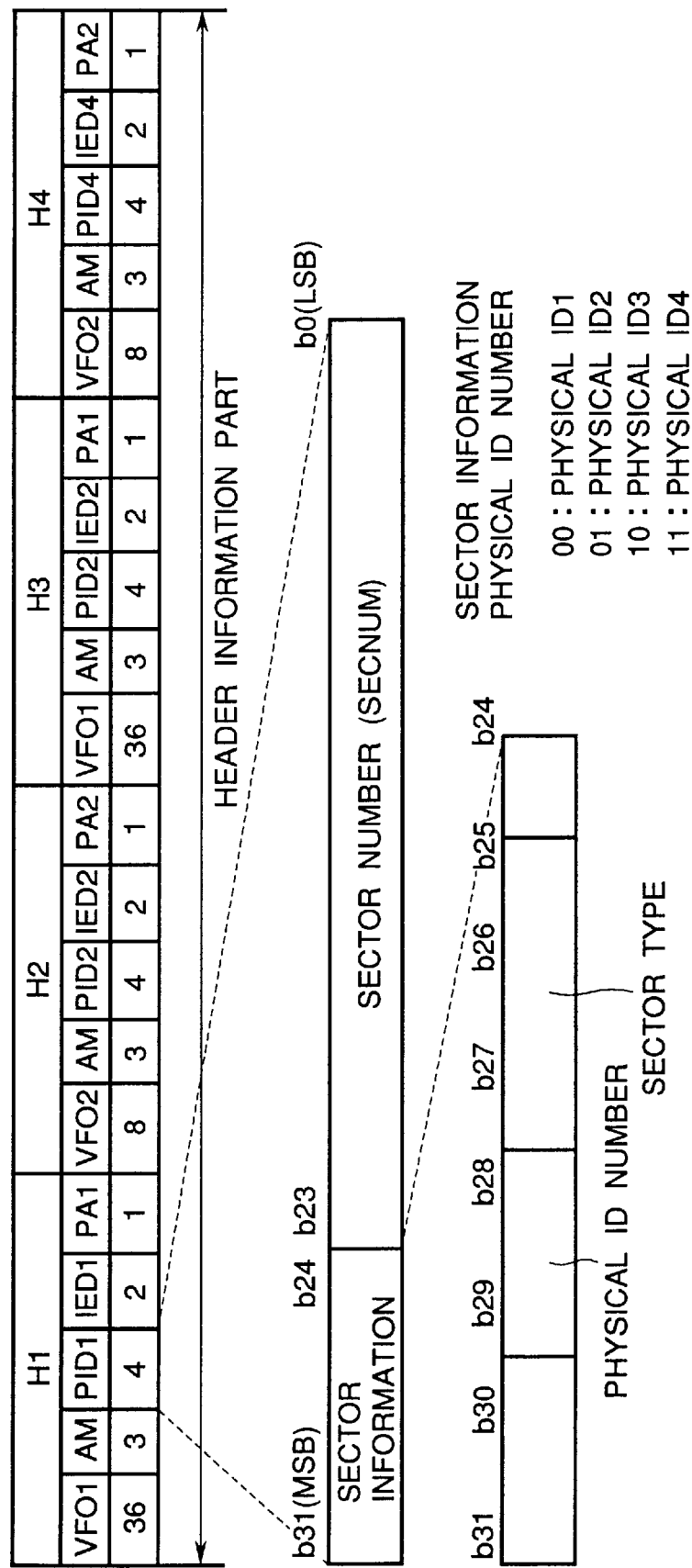
FIG. 12 shows a recording format of header information on the optical disk.

A position counter 10 is for detecting the position of the reproduced data on the basis of part of the addresses information contained in the headers, i.e., the position of the point from which the data being processed is read, within each sector. This position may be defined taking the starting point of the sector as a reference, i.e., as the distance or number of bytes between each position in question and the starting point of the sector. The part of the address information used for this purpose is the physical ID number contained in the PIDs (FIG. 12). Reference numeral 11 denotes a gate signal (window) generator.

The optical disk is assumed to have the configuration identical to that of the optical disk described with reference to FIG. 9 to FIG. 12.

The data processed at the ASP 2 is supplied to the header detector 4 where AMs (address marks) are detected from the header information read from a plurality of regions (four regions, in the case of DVD-RAM, at which the header information is repeatedly written) in the header at the head of each recording sector, and byte synchronization is performed.

The PID error detector 5 judges whether the information read from the respective regions is correct or not, from the error detection codes (IED1 to IED4) appended to the address regions (PID1 to PID4), and stores the result, as error detection information, for one sector. Signals generated to indicate the results of the judgment are denoted by IEDDET.

The error count comparator 6 detects the error detection information, and determines the number of PIDs which have been correctly read (or incorrectly read, i.e., the number of errors), and compares this number with the predetermined value.

The state counter 7 controls the transition (upward or downward transition) of the state of the system or the optical disk device according to the result of the comparison at the error count comparator 6, and determines the state of the optical disk device, i.e., which of a plurality of predefined stages or states the optical disk device is in.

The "state of the optical disk device" is defined in terms of the degree of accuracy at which the header information can be read. A plurality of states are defined for different degrees of accuracy at which the header information can be read. For instance, when the device has just been started, or when a track jump has just been made, the degree of accuracy at which the header information is read is low. In this case, the device is in state of a lower grade. When, on the other hand, the device is in a stable condition, the header information can be read at a high accuracy. In this case, the device is in a state of a higher grade. The transition between different states is therefore either upward transition to a state of a higher grade, or downward transition to a state of a lower grade.

In the example under consideration, four states, identified as state 0, state 1, state 2 and state 3, are defined. The state 3 is of the highest grade. The state is represented by a two-bit signal, and the state counter 7 of this embodiment is a two-bit counter.

The state is identified by a state flag. For this purpose, different state flags are assigned to different states.

The reproduction on/off judgment circuit 8 and the recording on/off judgment circuit 9 output commands for permission or prohibition of recording or reproduction in accordance with the state flag. When the state is in or above a certain grade, the device is judged to be in a condition in which recording or reproduction can be conducted properly. When the state is below the certain grade, the device is judged to be in a condition in which recording or reproduction cannot be conducted properly.

The reproduction on/off judgment circuit 8 and the recording on/off judgment circuit 9 can be implemented by a programmed MPU (microcomputer).

Figure 2:
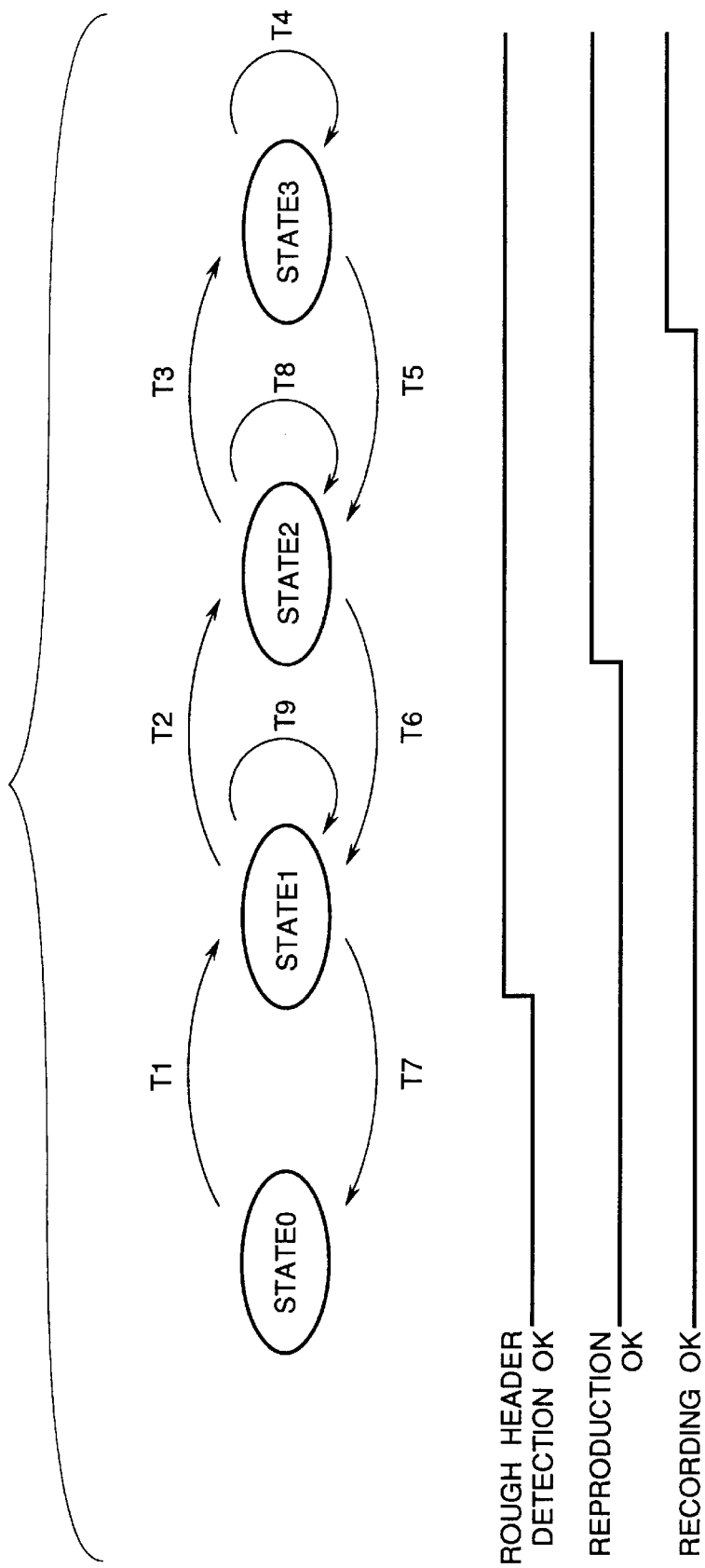
FIG. 2 is a diagram showing the transition between states in the header signal processing.

FIG. 2 shows the transition between states.

Initially, i.e., when the device is powered on, the device in state 0, which is the state of the lowest grade.

If the error count comparator 6 judges that information has been correctly read from not less than a predetermined number (e.g., 3) of address regions, out of the four regions (PID1 to PID4), the state counter 7 causes transition to state 1 (T1). The predetermined number (e.g., 3) is set by an external device such as a microcomputer, not shown.

If the error count comparator 6 judges, in the state 1, that information has been correctly read from not less than a predetermined number of address regions, the state counter 7 causes transition to state 2 (T2).

Similarly, if the error count comparator 6 judges, in the state 2, that information has been correctly read from not less than a predetermined number of address regions, the state counter 7 causes transition to state 3 (T3).

The predetermined number is set by an external device, such as a microcomputer, and is for example "3" per sector.

The timing at which the transition takes place is limited by a gate signal generated by the gate signal generator 11.

If, in the state 3, the error count comparator 6 judges that information has been correctly read from not less than a predetermined number of address regions, the state counter 7 causes the device to remain in the state 3 (T4).

If a state of a higher grade is defined (for this purpose, the number of bits of the state counter 7 must be greater than 2), transition to states of higher grades is allowed, or the difference between adjacent states, in terms of the degree of accuracy at which header information can be read, may be reduced, so that the state of the device can be identified more finely or accurately, the control over the device can be made more suitably for each condition, and the device can be made to operate more reliably and more efficiently.

If, in any state, the error count comparator 6 judges that information has been correctly read only from less than a predetermined number of address regions, the state counter 7 causes transition to a state of a lower grade (T5, T6, T7).

In a DVD-RAM, error correction processing with regard to reproduced user data is made taking 16 sectors as a unit. That is, information for 16 sectors are collected together, and subjected to error correction processing. In such a case, the transition to a lower state may be made to take place when the error count comparator 6 continues to judge that address information has been correctly read only from less than a predetermined number of address regions, over a predetermined number of sectors. That is, if judgment that information has been correctly read only from less than a predetermined number of address regions does not continue over the predetermined number of consecutive sectors, the device is made to remain in the same state (T8, T9). By adopting this scheme, the possibility of improperly halting the recording or reproduction, when in fact recording or reproduction is possible is reduced, and effective and proper control can be achieved.

Now reference is made to FIG. 1 again. The position counter 10 detects the position of the point from which the data being processed is read, within the sector (relative to the starting point of the sector), and is reset by physical ID numbers contained in the PIDs (FIG. 12). The gate signal generator 11 is responsive to the output of the position counter 10, for generating timing gates (windows) for improving the accuracy of detection of reproduced data, a recording timing gate indicating the timing for recording data in each sector, and a timing signal for transition at the state counter 7.

A reproduced data detector 12 extracts, using a reproduced data window, "user data from the recording sector" by removing the headers from the reproduced data having been read from the optical disk and binarized at the ASP 2.

Figure 13:
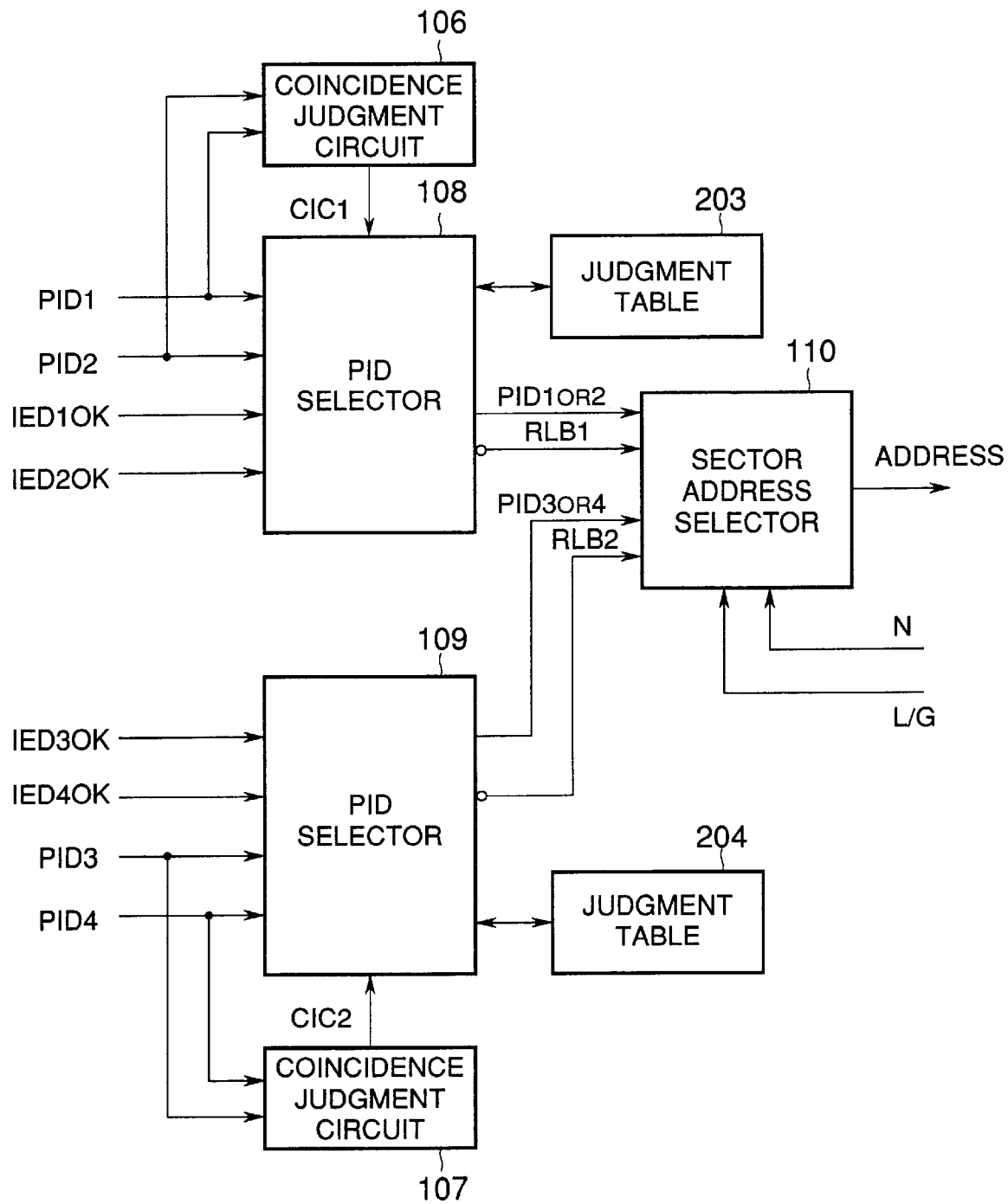
FIG. 13 is block diagram showing the configuration of a sector address reading section in a conventional optical disk device.

A reproduced data processor 13 performs demodulation of the reproduced data and error correction. A recording data processor 14 performs modulation or the like on the data to be recorded. A buffer memory 15 for temporarily storing recording data or reproduced data. A memory controller 16 controls the operation of the buffer memory 15. An address detector 17 detects sector addresses from PIDs having been read, and includes a circuit shown in FIG. 13.

The operation for reproduction will next be described with reference to FIG. 1.

First, the two signals from the two parts of the optical detector 1a are sent to the ASP 2, where the sum of the two signals are determined. The sum signal, which is also called "a reproduced signal" is amplified and binarized (digitized) within the ASP 2, into a digital signal.

The header detector 4 receives this digital signal, and performs byte synchronization, and detection of PIDs and IEDs.

The PID error detector 5 receives the PIDs as well as IEDs from the header detector 4, and performs error detection on the PID1 to PID4, and produces the error detection signal IED10K to IED40K, indicating the result of the error detection. IED10K will be at "H", if the PID1 having been read is found to be erroneous, and will be otherwise at "L". Similarly, IED20K will be at "H", if the PID2 having been read is found to be erroneous, and will be otherwise at "L". IED30K will be at "H", if the PID3 having been read is found to be erroneous, and will be otherwise at "L". IED40K will be at "H", if the PID4 having been read is found to be erroneous, and will be otherwise at "L".

The position counter 10 detects the position of the signal within the sector, in accordance with the physical ID number contained in the detected PIDs, and the gate signal generator 11 generates various detection windows (gate signals) and timing signals based on the output of the position counter 10.

The reproduced data detector 12 receives the reproduced signal from the ASP 2, and extracts the reproduced data using the reproduced data detection window generated by the gate signal generator 11. The reproduced data processor 13 performs data processing, such as 8/16 demodulation, error correction, descrambling, and detection of errors using error detection codes (EDCs). The processed data is temporarily stored in the buffer memory 15, and is then supplied to a host device, which may be formed of a personal computer. The memory controller 16 controls the operation of the buffer memory 15, including the temporary storage of data.

The PID error detector 5 performs the error detection using the IEDs, as mentioned above and produces IED10K to IED4OK, as mentioned above, and counts or determines the number of IEDs which are at "H" and stores the result of the count, as error detection information, for one sector.

The error count comparator 6 compares the number of IEDs which are at "H", as stored in the PID error detector 5.

Responsive to the output of the error count comparator 6, the state counter 7 controls the transition (upward or downward transition) of the state of the optical disk device according to the result of the comparison at the error count comparator 6, and determines the state of the optical disk device, and produces a stage flag.

The state flag is a two-bit signal of which the value corresponds to the four states, state 0, state 1, state 2 and state 3, described earlier.

The state flag is supplied to the reproduction on/off judgment circuit 8.

The reproduction on/off judgment circuit 8 accordingly supplies the memory controller 16 with the reproduction permission signal or reproduction prohibition signal, so that the control over reproduction (i.e., whether to permit or prohibit reproduction) is implemented by permitting or prohibiting the writing into the buffer memory 15.

The permission or prohibition of reproduction is meaningful only in a situation in which the optical pickup 1 has reached a target sector from which reproduction of data is desired. Whether the optical pickup 1 has reached the target is known by the address detected by the address detector 17. In a situation where the optical pickup 1 has not reached the target sector, the permission of the reproduction means nothing more than the fact that the state in which the reproduction is possible is maintained.

The operation during recording will next be described. The headers are read also during the recording to identify the sectors. When data to be recorded on an optical disk is supplied from a host device, which may be formed of a personal computer, it is stored in the buffer memory 15, and then supplied to the recording data processor 14, which performs data processing such as addition of error detection codes (EDCs), scrambling of data, error correction coding, and 8/16 modulation. The data is then supplied to the ALPC 3, which also receives recording timing gate signal from the gate signal generator 11, and the recording permission signal or recording prohibition signal from the recording on/off judgment circuit 9, which is responsive to the state flag from the state counter 7.

The recording of the data is controlled by these signals.

The permission or prohibition of recording is meaningful only in a situation in which the optical pickup 1 has reached a target sector into which recording of data is desired. Whether the optical pickup 1 has reached the target is known by the address detected by the address detector 17. In a situation where the optical pickup 1 has not reached the target sector, the permission of the recording means nothing more than the fact that the state in which the recording is possible is maintained.

As has been described, various states are defined according to the condition of the optical disk device, or the degree of accuracy at which the device can read header information, and the state of the device is determined in accordance with the result of the errors by means of the error detection codes (IEDs) read from the identification information parts associated with the recording sectors. As a result, control over recording and reproduction can be achieved more properly, so that the device can operate efficiently and reliably.

Embodiment 2

Figure 3:
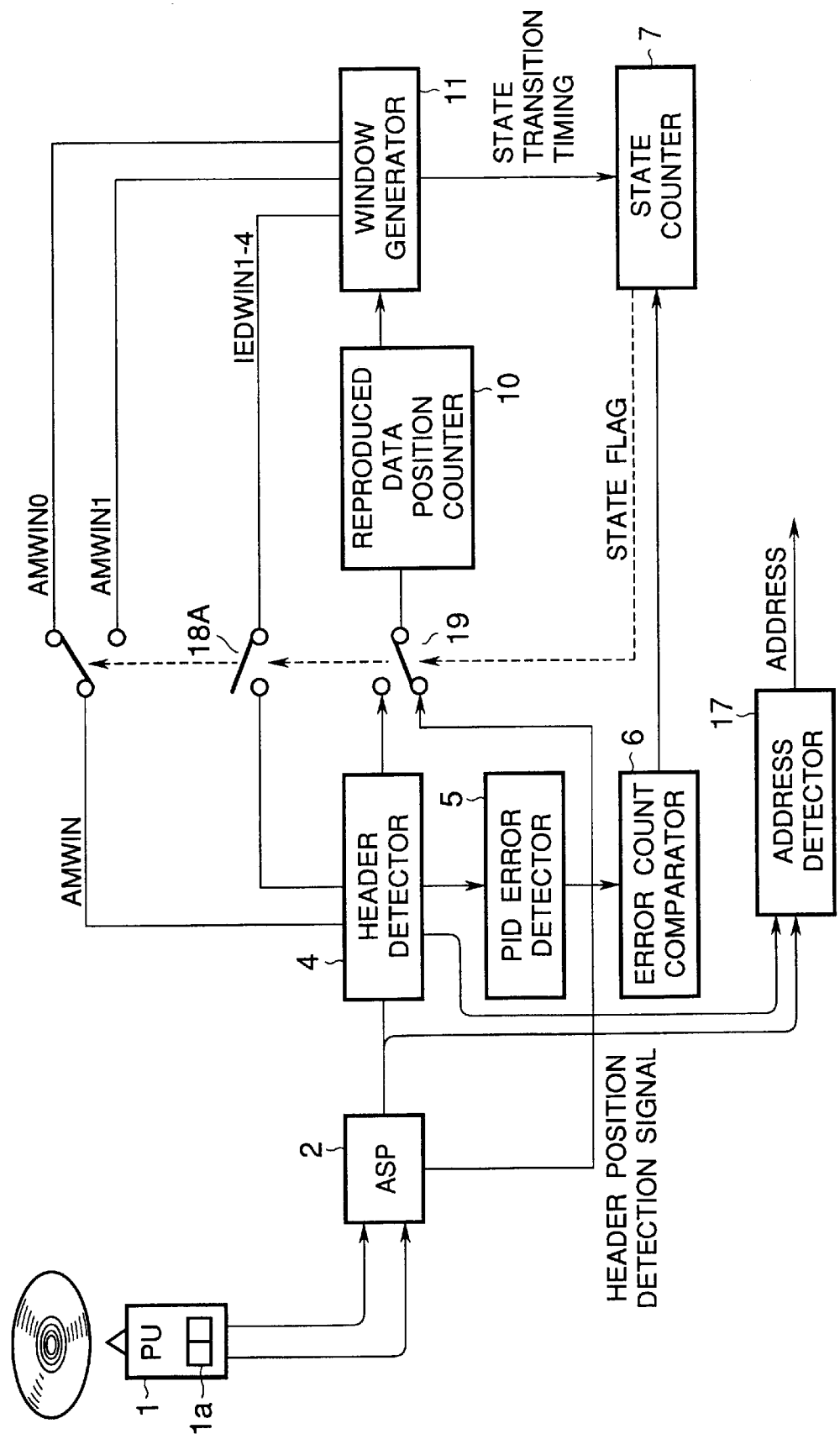
FIG. 3 is a block diagram showing the configuration of an optical disk device of Embodiment 2 of the present invention.

FIG. 3 is a block diagram showing part of the optical device of Embodiment 2 of the invention. The device is generally identical to that of FIG. 1. What follows is a description of differences from the device of FIG. 1.

In Embodiment 1, the header detector 4 extracts the AMs (address marks) from the reproduced data supplied from the ASP 2, to thereby detect the headers. In the pattern matching for finding the AMs in the header parts, an AM in a part other than the header parts, e.g., an AM in a user data part may be erroneously detected and erroneously recognized as an AM in a header part. In this case, the header detector 4 cannot extracts the header part correctly. The present embodiment provides a solution to this problem. That is, header detection windows (gate signals) are generated by the gate signal generator 11, to limit the timing of detection of the AMs in the header parts. In addition, in view of the fact that the outputs of the gate signal generator 11 are affected by the state of the optical disk device, the header detection gate signals are controlled according a state flag output from the state counter 7. That is, some of the header detection gate signals are made valid or invalid by closing or opening a window on/off switch 18A, while the header gate signals with different periods for which they are active are selectively used by switching a window selecting switch 18B.

Figure 4:
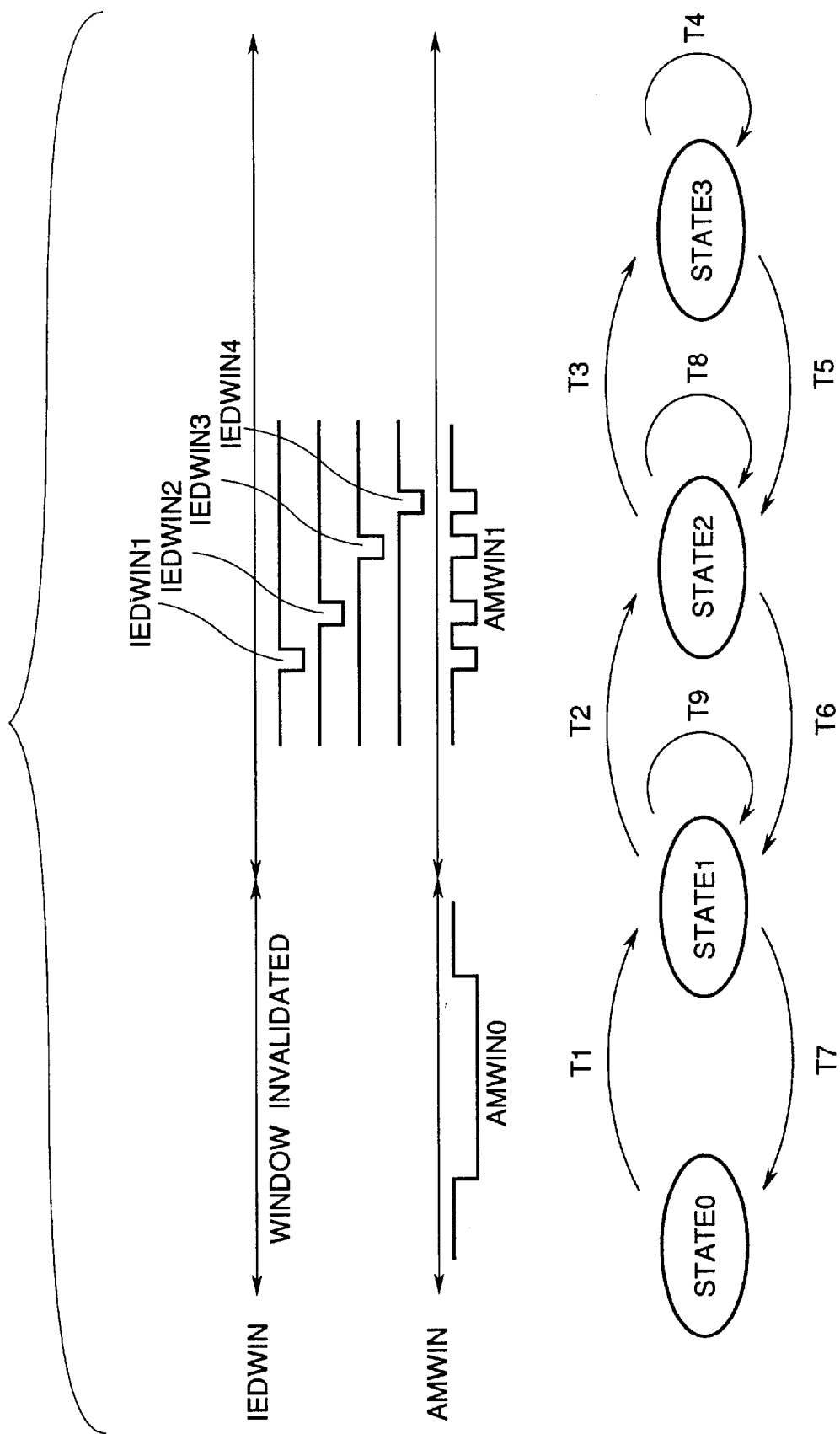
FIG. 4 is a diagram showing the detection windows for different states.

FIG. 4 shows an example of the manner of control over the header detection gate signals.

In the example under consideration, the header gate signals include AM detection gate signals AMWIN0 and AMWIN1, and IED detection gate signals IEDWIN1 to IEDWIN4, which are all supplied from the gate signal generator 11.

In the state 0 when the device is unstable, the switch 18B selects AMWIN0, so that a wide AM detection window (as defined by AMWIN0) is open over a period when the AM may appear, i.e., around the time point when the header is expected to appear, and the switch 18A is open, so that no timing limitation is imposed on the detection of IEDDET, as shown in the left half of FIG. 4.

In and above the state 1, when the device is more stable, the switch 18B selects AMWIN1, so that narrower AM detection windows (as defined by AMWIN1) are open, and the headers are detected more accurately, i.e., in a more stringent manner, as shown in the right half of FIG. 4.

The gate signal generator 11 generates the gate signals based on the detected position (within each sector), e.g., the position relative to the starting point of the sector. The position is known from the count value of the position counter 10, which is reset at a known position, after being loaded with a count value corresponding to the known position.

Signals supplied to the position counter 10 for indicating the known positions are switched according the state of the device.

The switching is effected at the position correction means selector 19. The position correction means selector 19 receives a header position detection signal detected at the ASP 2 for generating wide windows, and address information recorded in the PID, read at the header detector 4, used for generating narrow windows, and selects either of the outputs of the ASP 2 and the header detector 4 according to the state of the optical disk device.

Figure 5:
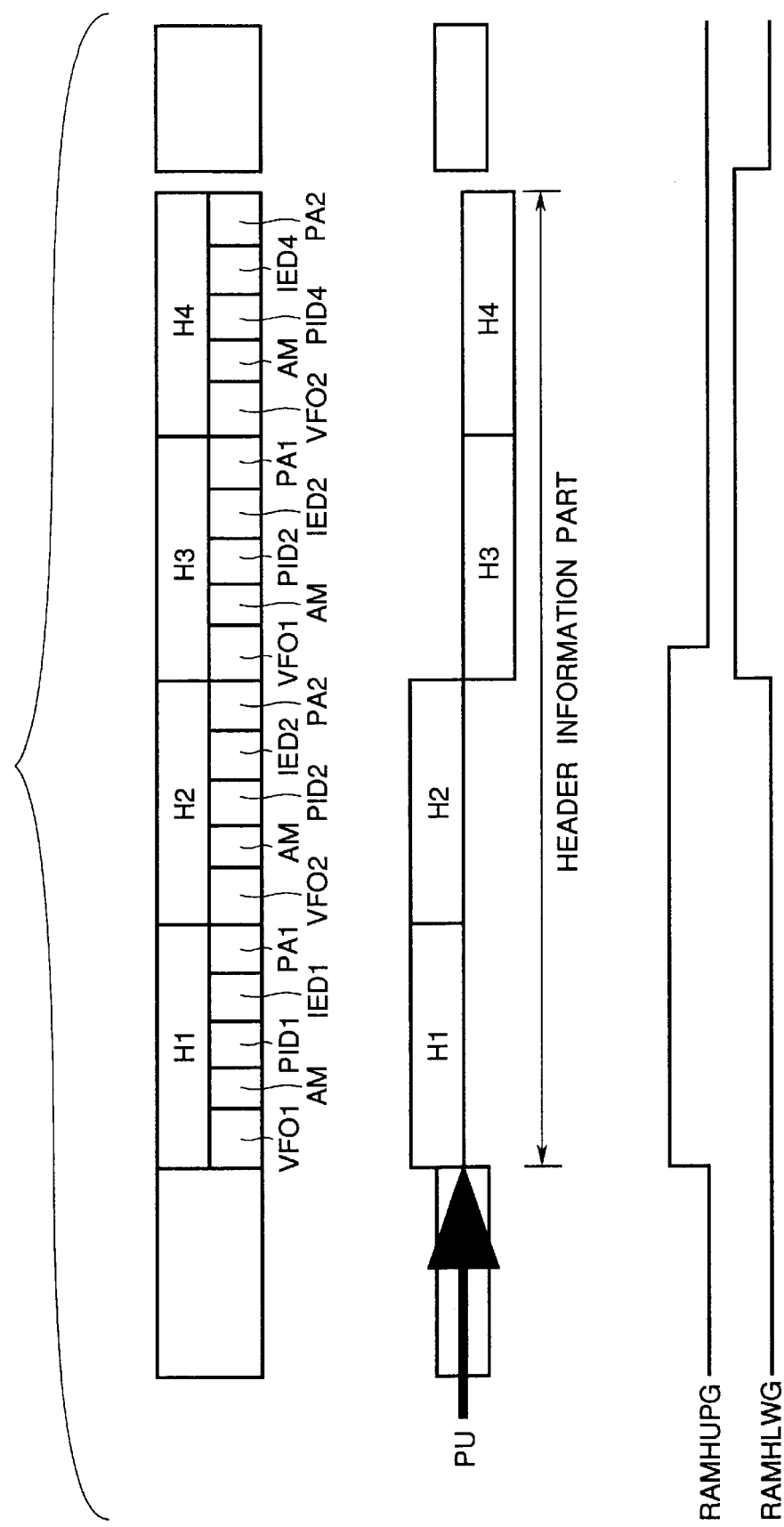
FIG. 5 is an example of header position detection signal supplied from the outside.

FIG. 5 shows the header position detection signal output from the ASP 2. The header position detection signal (RAMHUPG) indicates a signal indicating that the pickup 1 is scanning the headers H1 and H2 shifted radially outward. The header position detection signal (RAMHLWG) indicates a signal indicating that the pickup 1 is scanning the headers H3 and H4 shifted radially inward. The signal RAMHUPG and RAMHLWG have their tail ends extended, and RAMHUPG and RAMHLWG overlap each other. Based on these signals, the start of the header, and the median point (boundary between H2 and H3) of the headers is known, and based on the position information (concerning the start position or the median point), the reproduced data position counter 10 can detect the position within the sector from which the data being processed is read. The detection of the position can be achieved by resetting the reproduced data position counter 10 by the signal indicating the start position or the median point, or a signal having a certain known timing relationship with the start position or median point. The gate signal generator 11 can generate gate signals based on the detected position.

The address information output from the header detector 4 includes the physical ID numbers, indicating the order of the PID read (the order within the four PIDs, i.e., information indicating which of the four PIDs 1 to 4, the PID having been read is), and this information can be used as a more accurate position signal.

The position correction means selector 19 is switched according to the state flag from the state counter 7, so that the position counter 10 is controlled by signals indicating rough positions of the header and hence the reproduced data based on the signal from the ASP 2, in a sate 0 in which the device is unstable and the accuracy of the address information reproduced from the PID is low. The position counter 10 is controlled by signals indicating accurate positions of the header and hence the reproduced data from the address signal output from the header detector 4 in and above the state 1, in which the device is assumed to be more stable, and the accuracy of the output of the gate signal generator 11 is made higher according to the state of the device.

Embodiment 3

Figure 6:
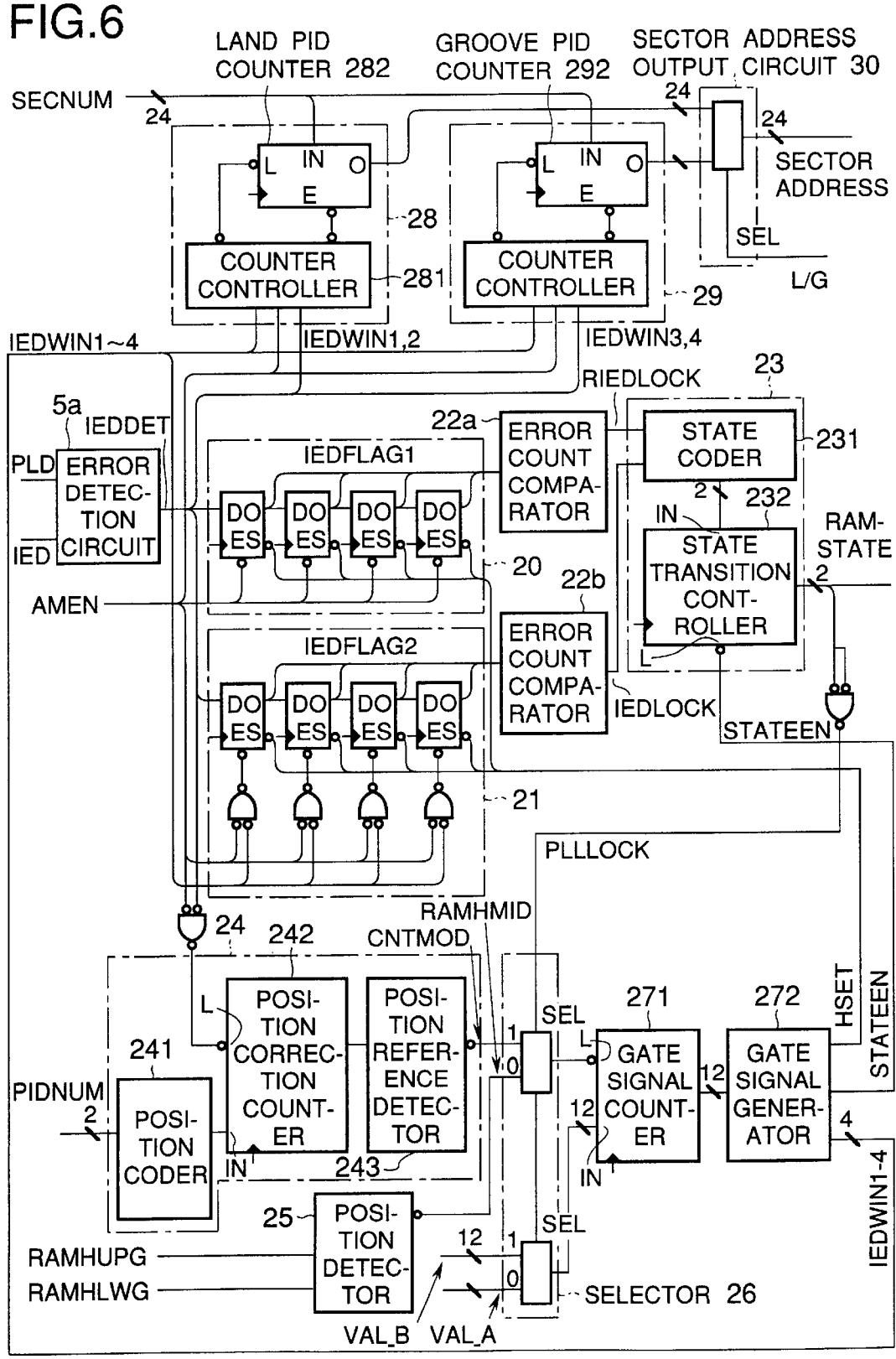
FIG. 6 is a block diagram showing the configuration of an optical disk device of Embodiment 3 of the present invention.

FIG. 6 is a block diagram showing a pertinent part of the optical disk device of Embodiment 3 of this invention. It shows, in a greater detail, an example of the circuits described in connection with Embodiment 2.

First, the configuration of FIG. 6 is explained referring also to FIG. 3. The PID error detector 5 includes an error detection circuit 5a, a first error result storage 20 and a second error result storage 21, and corresponds to the PID error detector 5 (shown in FIG. 3). The error detection circuit 5a detects errors in the PIDs read from the address regions, using IEDs, and produces signals IEDDET indicating the result of the error detection.

Error count comparators 22a and 22b correspond to the error count comparator 6 in FIG. 3. A state transition controller 23 corresponds to the state counter 7 in FIG. 3 and comprises a state coder 231 and a state counter 232.

A first position detector 24 comprises a position coder 241, a position correction counter 242, and position reference detector 243. The first position detector 24 and a second position detector 25 together form part of the reproduced data position counter 10 in FIG. 3.

A position correction means selector 26 corresponds to the position correction means selector 19 in FIG. 3.

A gate signal counter 271 forms another part of the position counter 10.

A gate signal generator 272 corresponds to the gate signal generator 11 in FIG. 3.

In the example shown in FIG. 6, the position correction means selector (26) is inserted between the first position detector 24 and the gate signal counter 271, which in combination form the position counter. However, the function similar to that described in connection with FIG. 3 is achieved.

The gate signal counter 271 keeps counting the clock generated from the reproduced data, in particular the VFO. At a certain known timing corresponding to a certain position from which the data being processed is read, the gate signal counter 271 is reset (by a signal supplied to terminal "L") and loaded with a value (VAL-A or VAL-B) supplied to the terminal "IN", and continues counting up the clock.

The gate signal generator 272 is responsive to the count value of the gate signal counter 271, and generates gate signals and timing signals according to the count value. Whether each gate signal or timing signal should be active at each count value is predetermined and stored for example in a ROM within the the gate signal generator 272.

The position correction counter 242 also keeps counting the clock generated from the reproduced data, in particular the VFO. At a certain known timing corresponding to a certain position from which the data being processed is read, the position correction counter 242 is reset (by a signal supplied to terminal "L") and loaded with a value (VAL-C1, VAL-C2, VAL-C3, VAL-C4) supplied to the terminal "IN", and continues counting up the clock.

A land PID detector 28 comprises a land PID counter controller 281, and a land PID counter 282.

A groove PID detector 29 comprises a groove PID counter controller 291, and a groove PID counter 292.

A sector address output section 30 selects either the output of the land PID counter 282 or the output of the groove PID counter 292 according to the value (H or L) of the land/groove signal L/G.

The combination of the land PID detector 28, the groove PID detector 29, and the sector address output section 30 corresponds to the address detector 17 in FIG. 3.

Signals input to the respective circuits in FIG. 6 are as follows.

SECNUM, AMEN and PIDNUM are supplied from the header detector 4. RAMHUPG and RAMHLWG are supplied from the ASP 2.

Each of the PIDs is formed of 4 bytes (32 bits: b31 to b0), as shown in FIG. 12. The combination of b29 and b28 is denoted in this specification by PIDNUM (physical ID number), and indicates the order of the PID within the four PIDs (i.e., indicating which of the four PIDs the PID including this combination of b29 and b28 is). The value of the PIDNUM is "00", "01", "10" or "11" when the order is the "first", "second", "third", or "fourth" in the four PIDs. The combination of b29 and b28 can be used for detecting the position being scanned by the pickup 1. The value of the PIDNUM is coded at the position coder 241 into the value VAL-C1, VAL-C2, VAL-C3 or VAL-C4. These values VAL-C1, VAL-C2, VAL-C3, and VAL-C4 represents the position (within the sector) corresponding to the timing at which the result of error detection using IED is obtained, e.g., the end of IED part or the end of each header (since the IED is recorded near the end of each header). For example, they represent the distance between the starting point of the (header information part of the sector and the end point of the corresponding header (H1, H2, H3 or H4), in terms of the number of bytes. Thus, VAL-C1 may be "46", VAL-C2 may be "64", VAL-C3 may be "110", and VAL-C4 may be "128", in the example shown in FIG. 12.

The data of three bytes, b23 to b0, represents the sector address (on the optical disk) of the recording sector, is also called a sector number and is represented by "SECNUM".

In header detection conducted at the header detector 4, syndrome calculation using the IED appended to the PID is conducted in byte units, i.e., byte by byte. If the result of the calculation is zero, the signal IEDDET (IED detector) will be "Low", indicating that no error is present. An enable signal indicating the timing at which the result of the calculation appears is denoted by AMEN.

When AMEN is Low, and if IEDDET is also Low, it is judged that the IED of the header PID is good (OK), that is the PID has been read correctly. In the following description, the statement "IED is OK" means that this condition (AMEN and IEDDET are both Low) is met.

IEDWIN (IED window) comprises IEDWIN1 to IEDWIN4, each of which is Low at or near the positions where AMEN corresponding to each of the PID1 to PID4 is expected to appear. They are windows for ensuring that the values of the IEDs are checked at correct timings. If IED is OK while IEDWIN1 is Low, IED10K is true or Low (FIG. 14A). If IED is OK while IEDWIN2 is Low, IED20K is true or Low (FIG. 14A). If IED is OK while IEDWIN3 is Low, IED30K is true or Low (FIG. 14B). If IED is OK while IEDWIN4 is Low, IED40K is true or Low (FIG. 14B).

HSET is produced from the gate signal generator 272 and indicates the start of the header. STATEEN also produced from gate signal generator 272 indicates a timing of transition of the state. These as well as other detection windows and the timing signals are also generated at the gate signal generator 272.

RAMHUPG and RAMHLWG are as described in connection with Embodiment 2.

L/G indicates a land/groove signal indicating whether the track being scanned by the pickup 1 is a land track or a groove track, and is also called a switching signal (between land and groove). The L/G signal is produced based on the (staggering) change of direction of the shifting of the tracking error signal obtained when the headers are scanned, or based on the L/G switching point detection signal included in the headers.

The operation will now be described.

First, the manner of transition of the state is described.

The first error detection result storage 20 includes four registers and latches contents of the IEDDET in the registers at the timings defined by AMEN. The values stored in the registers form a flag IEDFLAG1. The second error detection storage 21 includes four registers and latches contents of the IEDDET in the registers at the timings defined by AMEN and IEDWIN1 to IEDWIN4. The values stored in the registers, which correspond to IED10K to IED40K in FIG. 13, form a flag IEDFLAG2.

In the DVD-RAM, the header information is written four times. This is why each of the first and second error detection result storages 20 and 21 in FIG. 6 comprises four registers.

The first error count comparator 22a checks the value of each of the four bits IEDFLAG1 in the registers in the first error detection result storage 20, and detects the number of bits which are Low, (thereby detecting the number of errors or the number of PIDs having been correctly read) and changes the value of a flag RIEDLOCK output therefrom according to the detected number of bits which are Low. That is, if the detected number of which are Low is not less than a predetermined number, the flag RIEDLOCK is made High, indicating that the header of the sector has been correctly read. If the detected number is less than the predetermined number, the flag RIEDLOCK is made Low indicating that the header of the sector has not been correctly read.

Similarly, the second error count comparator 22b checks the value of each of the four bits IEDFLAG2 in the registers in the second error detection result storage 21, and detects the number of bits which are Low, and changes the value of a flag IEDLOCK output therefrom according to the detected number of bits which are Low. That is, if the detected number of bits which are Low is not less than a predetermined number, the flag IEDLOCK is made High, indicating that the header of the sector has been correctly read. If the detected number is less than the predetermined number, the flag IEDLOCK is made Low indicating that the header of the sector has not been correctly read.

The state coder 231 in the state controller 23 receives the signals RIEDLOCK and IEDLOCK from the 22a and 22b, and selects and uses the signal RIEDLOCK in the state 0, and selects and uses the signal IEDLOCK in the state 1, 2 or 3.

Thus, the signal RIEDLOCK based on the outputs of the first error detection result storage 20 is selected and used by the state coder 231 in the state 0, while in the state 1, 2 or 3, the signal IEDLOCK based on the outputs of the second error detection result storage 21 is selected and used by the state coder 231.

As was mentioned earlier, in the state 0, the AMs are detected using widows generated based on the header position detection signal RAMHUPG and RAMHLWG (output of ASP 2 in FIG. 3) and IEDDET are detected without timing limitation of windows. In the state 1, 2, or 3, the AMs are detected using narrower windows generated based on the physical ID numbers, and IEDDET are detected using windows also generated based on the physical ID numbers.

In other words, the error detection results are obtained in a rough manner or position in the state 0, and in a more stringent manner or position in the state 1, 2 or 3.

The output of the state coder 231 is "0", "1", "2" or "3", respectively indicating the state 0, state 1, state 2 or state 3.

The contents of the state coder 231 is latched at the timing defined by a timing signal STATEEN generated by the gate signal generator 272.

This timing signal STATEEN is generated at a timing after all the error detection results within each sector have been obtained. The output of the state counter 232 is "0", "1", "2" or "3", respectively indicating the state 0, state 1, state 2 or state 3.

In this way, the state transition controller 23 controls the transition of the state responsive to the flags RIEDLOCK and IEDLOCK.

If, in the state 0, the flag RIEDLOCK becomes High, i.e., the header has been detected in a rough position, transition to the state 1 is made.

In or above the state 1, if the flag IEDLOCK becomes High, i.e., if the header is correctly detected in more stringently defined position, transition to a higher state is effected.

The configuration of the state transition controller 23 is not limited to that described above. For instance, the state coder 231 may be configured to output a signal indicating whether the transition is to be made or not, and, if the transition is to be made, the direction of the transition to be made, i.e., upward or downward, and an up-down counter may be provided to receive the signal from the state coder 231. In this case, the output of the up-down coder is "0", "1", "2" or "3", respectively indicating the state 0, state 1, state 2 or state 3.

The manner of transition between states may be different from that shown in FIG. 4.

The procedure for the generation of the windows (gate signals) will next be described.

The first position detector 24 detects the position being scanned, based on the signal PIDNUM which is supplied from the header detector 4, and which indicates the order of the PID (within the four PIDs) which is being reproduced.

The second position detector 25 detects the position being scanned, based on the header position signals RAMHUPG and RAMHLWG which have been obtained by detection in an analog manner in the ASP 2, and is output from the ASP 2. That is, the output RAMHMID of the second position detector 25 is Low at the beginning of the period when both of the signals RAMHUPG and RAMHLWG are High.

The position correction means selector 26 selects either of the outputs from the first and second position detectors 24 and 25, according to the state of the optical disk device.

In the embodiment shown in FIG. 6, the output of the second position detector 25 is selected in the state 0, and the output of the first position detector 24 is selected in other states (state 1, state 2, and state 3).

The selected output is supplied to the gate signal counter 271.

Figure 7A:
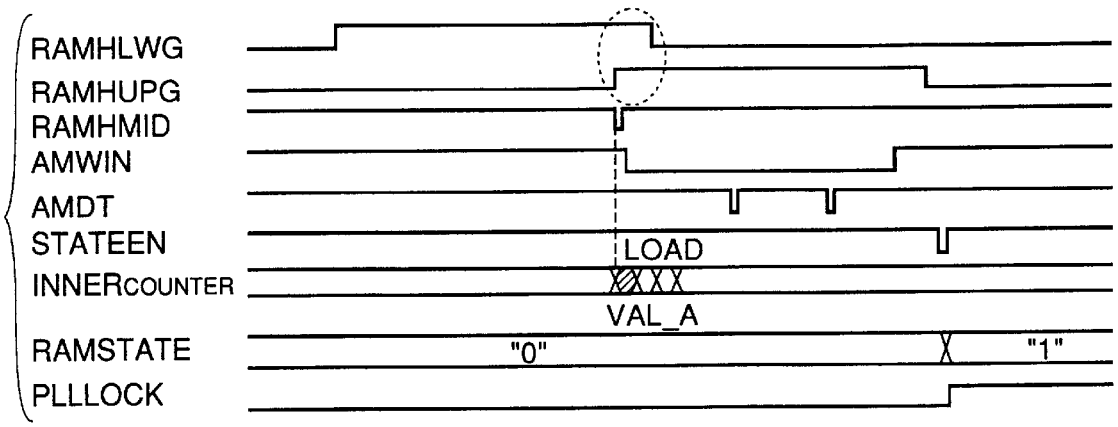
FIG. 7A and FIG. 7B are timing charts showing the operation for position correction.
Figure 7B:
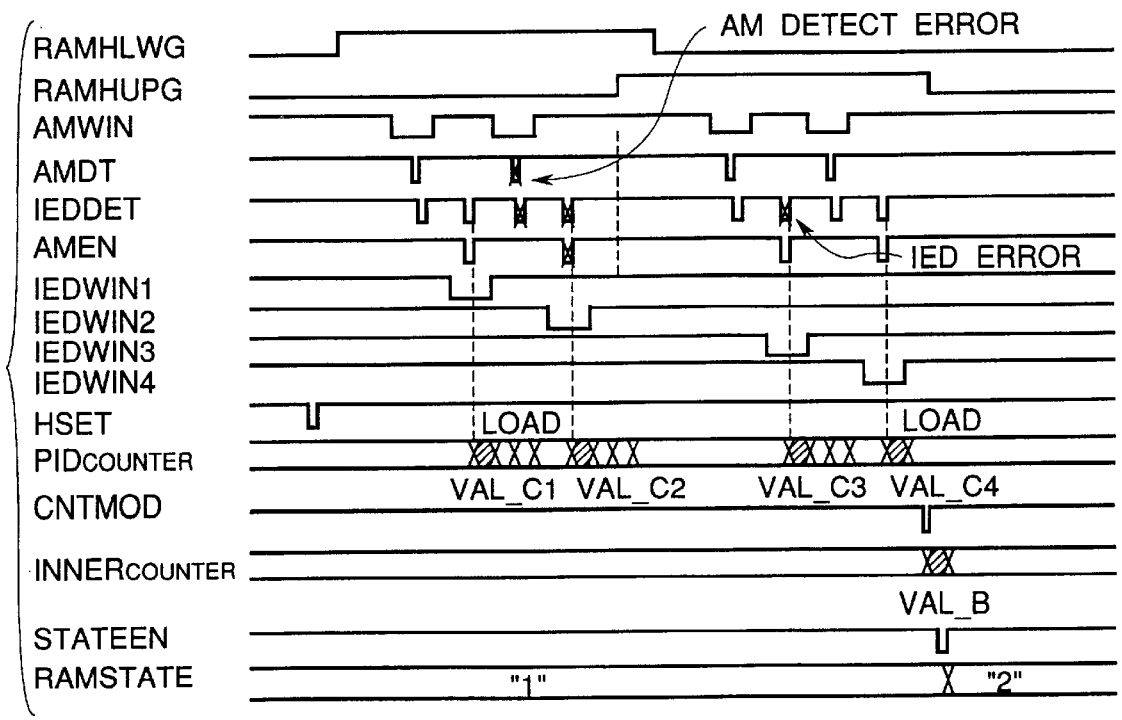

FIG. 7A and FIG. 7B are timing charts showing the position correction operation.

FIG. 7A shows signals generated at the time of transition from state 0 to state 1. The signal RAMHMID is generated from the overlap of the signals RAMHUPG and RAMHLWG, as described above. This is the load timing of the gate signal counter (INNER counter) 271 in the state 0. That is, the load value VAL-A is loaded, and the gate signal counter 271 continues counting the clock from the newly loaded value VAL-A. The value of VAL-A corresponds to the position where the signal RAMHMID falls, i.e., at about the middle of the header information region, with respect to the starting point of the header information region. For example, the value VAL-A may be "64" which is the number of bytes present between the median point and the starting point of the header information region, in the example shown in FIG. 12.

The gate signal generator 272 generate various gate signals and timing signals based on the count value of the gate signal counter 271.

Among the gate signals generated are AMWIN and STATEEN. AMWIN in FIG. 7A. AMWIN corresponds to AMWINO in FIG. 3 and FIG. 4.

The address marks AMs (FIG. 5) are detected using AMWIN thus generated.

AMDT shows the detected AMs. AMEN is produced a certain number of bytes after AMDT is produced.

IEDDET are also detected, without using windows, i.e., without limitation as to the timing.

When the number of IEDDETs indicating OK is not less than the predetermined value, the RIEDLOCK goes High, and the state coder 231 is increased by 1, and the new output of the state coder 231 is latched into the state counter 232 at the timing of STATEEN. Thus, transition to state 1 is effected.

FIG. 7B shows signals generated at the time of transition from the state 1 to state 2. The value of PIDNUM, i.e., the order (within the four PID1 to PID4) of the address region being scanned, which is represented by one of the values 00, 01, 10 and 11, is supplied to and coded at the position coder 241 into VAL-C1, VAL-C2, VAL-C3 or VAL-C4, and is loaded into the position correction counter (PID counter) 242. In the illustrated example, the IEDDET for the PID1 is OK, so that the value VAL-C1 is loaded into the position correction counter 242. PID2 contains an AM detection error, and PID3 contains a PID error ("x" at the downward going pulse means that the signal remains High), so that, in both of these cases, IEDDET is not OK, and no new value is loaded into the position correction counter 242, which therefore keeps counting a clock generated based on reproduced VFO. At the PID4, the IEDDET is again OK, so that the value VAL-C4 is loaded into the position correction counter 242, and the position correction counter 242 continues to count up the clock starting with the newly loaded value VAL-C4.

When the count value of the position correction counter 242 reaches a predetermined value, the position reference detector 243 outputs a signal CNTMOD. A value VAL-B matching the timing at which the CNTMOD is generated is loaded into the timing signal counter 271. The timing at which the CNTMOD is generated is after all the error detection results by means of IEDDET within each sector have been detected, and before the timing at which STATEEN is to be generated.

When the value VAL-B is loaded, the gate signal counter 271 continues counting the clock from the newly loaded value VAL-B.

The gate signal generator 272 generate various gate signals and timing signals based on the count value of the gate signal counter 271.

Among the gate signals generated by the gate signal generator 272 are AMWIN, IEDWIN1 to IEDWIN4, and STATEEN shown in FIG. 7B. AMWIN corresponds to AMWIN1 in FIG. 3 and FIG. 4.

The address marks AMs (FIG. 5) are detected using AMWIN thus generated. IEDDET are detected using IEDWIN1 to IEDWIN4 thus generated.

AMDT shows the detected AMs. IEDDET shows the results of detection by the use of IEDs.

When the number of IEDDETs indicating OK is more than the predetermined value, the IEDLOCK goes High, and the output of the state coder 231 is increased by 1, and the new output of the state coder 231 is latched into the state counter 232 at the timing of STATEEN. Thus, transition to state 2 is effected.

The manner of outputting the sector address will next be described.

The land PID detector 28 is formed of the land PID counter controller 281, and the land PID counter 282. When the PID1 or PID2 is correctly read (IEDDET is OK in connection with PID1 or PID2), the value SECNUM (three bytes, or 24 bits) is loaded into the land PID counter 282. If neither of PID1 and PID2 is correctly read, the count value of the land PID counter 282 is incremented by "1". The operation of the land PID counter 282 is performed under control by the land PID counter controller 281.

The groove PID detector 29 is similar to the land PID detector 28. That is, the groove PID detector 29 is formed of the groove PID counter controller 291, and the groove PID counter 292. When the PID3 or PID4 is correctly read (IEDDET is OK in connection with PID3 or PID4), the value SECNUM (three bytes, or 24 bits) is loaded into the groove PID counter 292. If neither of PID3 and PID4 is correctly read, the count value of the groove PID counter 292 is incremented by "1". The operation of the groove PID counter 292 is performed under control by the groove PID counter controller 291.

The sector address output circuit 30 selects the land sector address output from the land PID counter 282 or the output from the groove PID counter 292, in accordance with the land/groove signal L/G supplied from an external circuit, not shown, and thereby outputs the address of the sector being scanned.

The operation of reading the sector address will next be described with reference to FIG. 8. The signals input to the block formed of the land PID detector 28, the groove PID detector 29 and the sector address output circuit 30 are IEDDET, AMEN, IEDWIN1 to IEDWIN4, SECNUM, and L/G.

When the AM detection signal AMDT goes Low (Active) within the period of the AM detection window AMWIN, the header signal processing is performed byte by byte. In other words, if the AM is not correctly detected, IEDDET does not become OK. If the PID having been read contains an error, IEDDET does not become OK.

Figure 8:
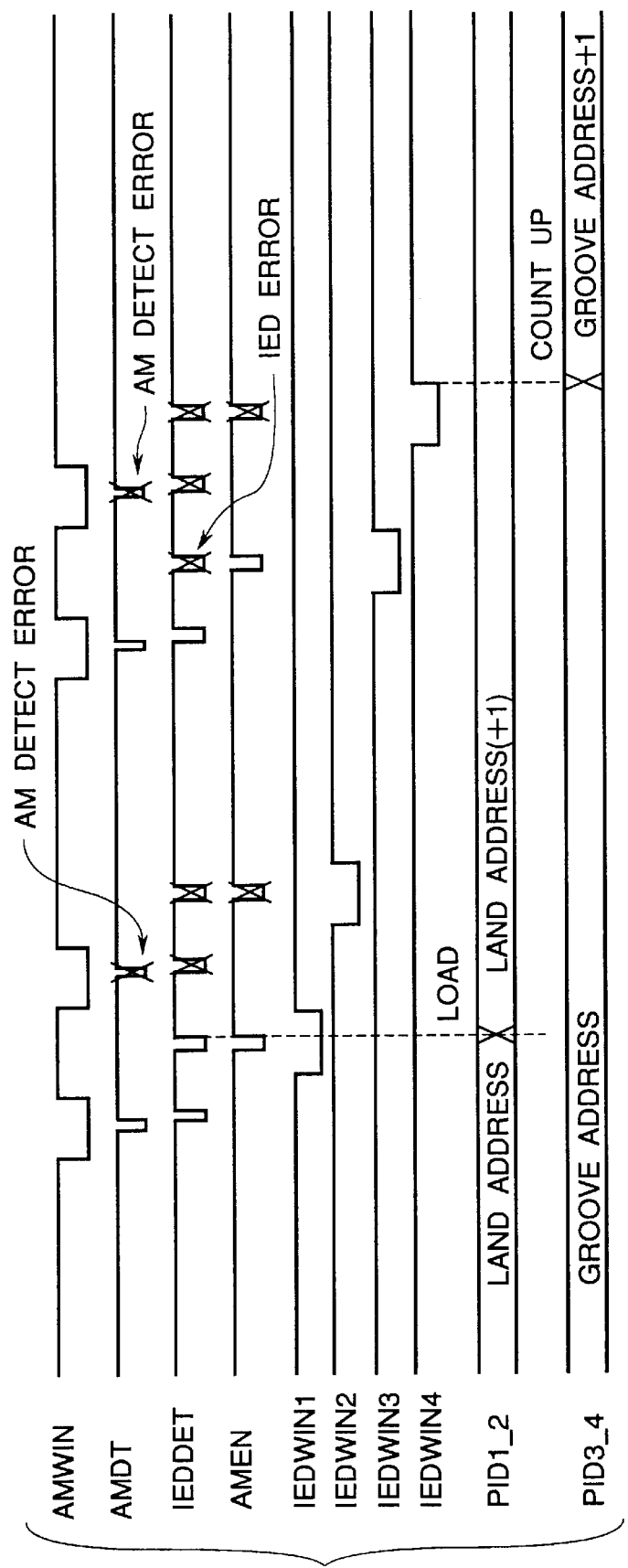
FIG. 8 is a timing chart showing the operation for reading sector addresses.
Figure 9:
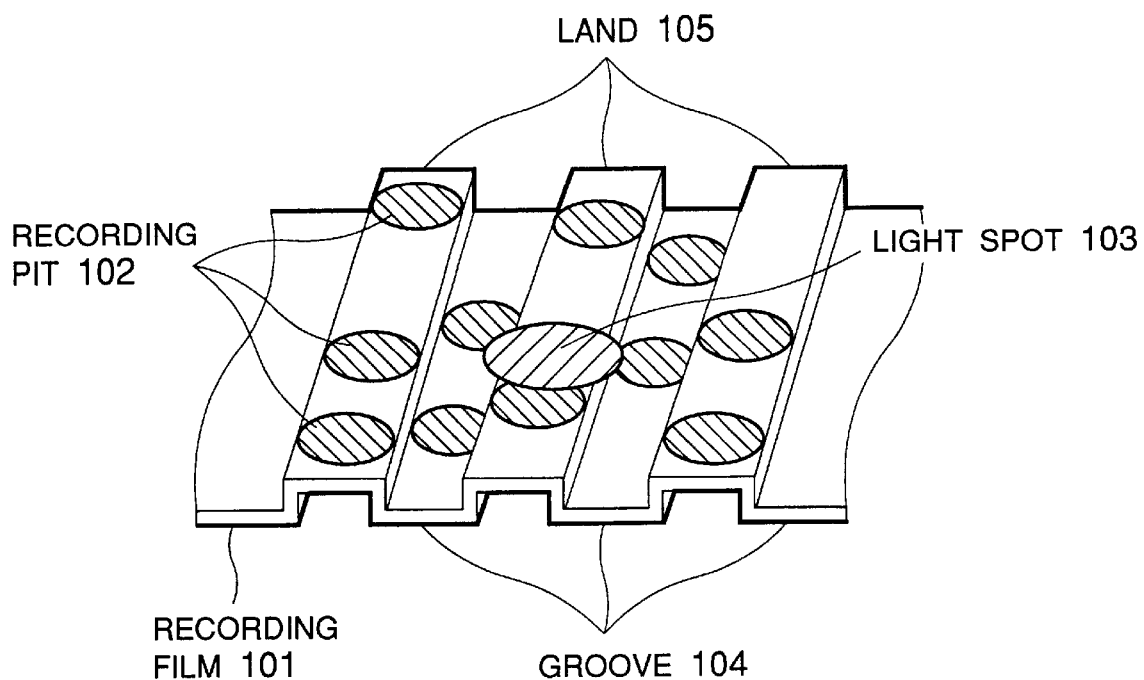
FIG. 9 is a diagram showing the structure of an optical disk of a single spiral-land/groove configuration.
Figure 11A:
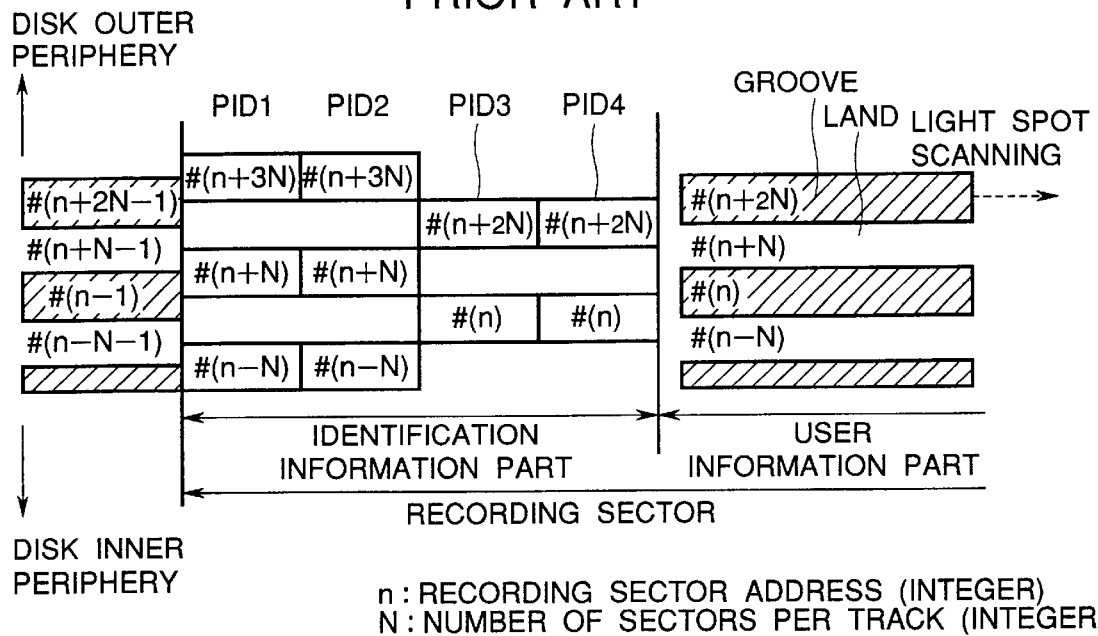
FIG. 11A and FIG. 11B are diagrams showing the disposition of identification information in the recording sector and the addresses recorded therein.
Figure 11B:
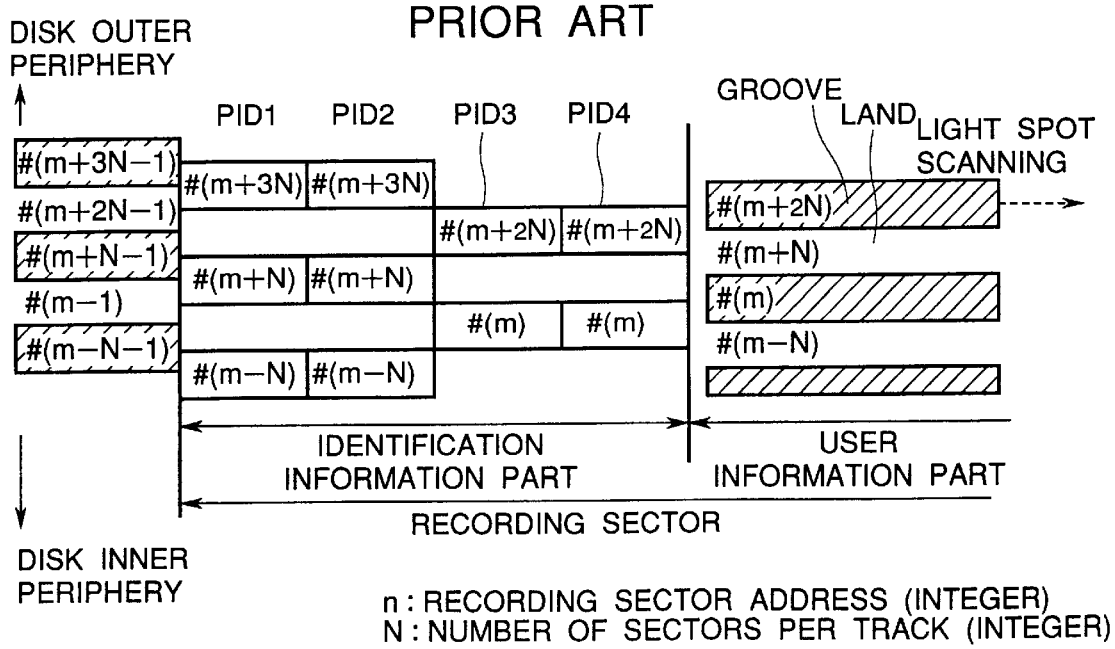

In the example shown in FIG. 8, IEDDET goes Low, and the AMEN goes Low within the period of IEDWIN1. That is, IEDDET becomes OK at a predetermined position as defined by AMEN. Accordingly, SECNUM being read at this moment is loaded into the land PID counter 282.

In the illustrated example, AMDT is marked with "x" which means that the AM appended to the PID2 has not been correctly detected, so that no loading occurs at IEDWIN2.

With regard to PID3, AM is correctly detected, but the PID contains an error, as indicated by IEDDET marked with With regard to PID4, IEDDET does not become OK for the same reason as PID2.

When neither of PID3 and PID4 is correctly detected, as described above, the count value of the groove PID counter 292 is incremented by "1" at a timing, such as at the end of IEDWIN4.

The output of the land PID counter 282 or the groove counter 292 is selected at the sector address output circuit 30 depending on whether the signal L/G is High or Low. In this way, the sector address is securely obtained.

In the DVD-RAM, two kinds of addresses in the header information part are continuously scanned. Accordingly, it is necessary to recognize whether the address being read is in the front part or in the rear part. To this end, the signals IEDWIN1 to IEDWIN4 generated by the gate signal generator 272 is utilized.

What is claimed is:

1. A state detecting device for detecting a state of an optical disk device recording data in and reproducing data from an optical disk having a header information part for each sector, each header information part including a plurality of header regions each including an address region for holding address information and an address error detection region for holding an address error detection code for detecting an error in the address information read from the address region;

said state detecting device comprising:
a header detector detecting the header regions of a header information part;

an error detector judging whether or not the error detection code read from the address error detection region included in each of the detected header regions indicates an error in the address information read from the corresponding address region, and holding the number of errors for the detected header regions of the header information part;

an error count comparing unit comparing the number of errors held in the error detector with a predetermined number; and a state controller responsive to the output of the error count comparing unit for causing transition to a higher or lower state, to thereby identify the state of the optical disk device.

2. The state detecting device according to claim 1, wherein said state controller causes transition to a higher state when the number of errors held in the error detector is not more than the predetermined value and causes transition to a lower state when the number of errors held in the error detector is more than the predetermined value.

3. The state detecting device according to claim 1, wherein said state controller causes transition to a lower state when the number of errors held in the error detector continues to be more than the predetermined value for a predetermined number of sectors.

4. The state detecting device according to claim 1, wherein said header detector detects the header regions using a first header detection window generated based on the address information, or a second header detection window generated based on a header position detection signal indicating the arrangement of the plurality of header regions contained in one sector.

5. The state detecting device according to claim 4, wherein said header detector detects the header regions using said first header detection window when the optical disk device is in or above a predetermined state, and detects the header regions using said second header detection window when the optical disk device is below said predetermined state.

6. An optical disk device recording data in and reproducing data from an optical disk having a header information part for each sector, each header information part including a plurality of header regions each including an address region for holding address information and an address error detection region for holding an address error detection code for detecting an error in the address information read from the address region, said optical disk device comprising:

an optical head for writing data on and reading data from an optical disk device;

a header detector detecting the header regions of a header information part from the data read by said optical head;

an error detector judging whether or not the error detection code read from the address error detection region included in each of the detected header regions indicates an error in the address information read from the corresponding address region, and holding the number of errors for the detected header regions of the header information part;

an error count comparing unit comparing the number of errors held in the error detector with a predetermined number;

a state controller responsive to the output of the error count comparing unit causing transition to a higher or lower state, to thereby identify the state of the optical disk device; and a recording/reproducing means for controlling the recording and reproducing operation of the optical disk device in accordance with the result of the judgment by said state controller.

7. The optical disk device according to claim 6, wherein said recording/reproducing controller permits recording of data on and reproduction of data from the optical disk when said optical disk device is in or above a predetermined state, and prohibits the recording and reproduction when said optical disk device is below said predetermined state.

8. The optical disk device according to claim 6, wherein said state controller causes transition to a lower state when the number of errors held in the error detector continues to be more than the predetermined value for a predetermined number of sectors.

9. The optical disk device according to claim 6, wherein said header detector detects the header regions using a first header detection window generated based on the address information, or a second header detection window generated based on a header position detection signal indicating the arrangement of the plurality of header regions contained in one sector.

10. The optical disk device according to claim 6, wherein said header detector detects the header regions using said first header detection window when the optical disk device is in or above a predetermined state, and detects the header regions using said second header detection window when the optical disk device is below said predetermined state.

11. An optical disk device recording data in and reproducing data from an optical disk having a header information part for each sector, each header information part including a plurality of header regions each including an address region for holding address information and an address error detection region for holding an address error detection code for detecting an error in the address information read from the address region; a front part of said header information part being shifted from the center of a track by half a track pitch in one of a radially inward and radially outward directions, and a rear part of said header information part being shifted from the center of a track by half a track pitch in the other of a radially inward and radially outward directions, said optical disk device comprising:

an optical head for forming a light spot for writing data on and reading data from an optical disk;

an analog signal processor responsive to the output of said optical head for producing a reproduced signal and a tracking error signal;

a header detector detecting the header regions from the data read by said optical head;

an error detector judging whether or not the error detection code read from the address error detection region included in the detected header region indicates an error in the address information read from the address region, and holding the number of errors for one sector;

an error count comparing unit comparing the number of errors held in the error detector with a predetermined number;

a state controller responsive to the output of the error count comparing unit for causing transition to a higher or lower state, to thereby identify the state of the optical disk device; and a window generator generating a detection window signal or a timing signal based on the address information contained in the detected header region, when the result of judgment by said state controller indicates that the optical disk device is in or above a predetermined state, and for generating a detection window signal or a timing signal based on address information which indicates the position within the sector and is generated based on the output of said optical analog signal processor at the time when the light spot passes the header region, when the state indicated by said state controller indicates that the optical disk device is below said predetermined state.

12. The optical disk device according to claim 11, wherein said header detector detects said header regions using a header detection window generated by said window generator.

13. A method of detecting a state of an optical disk device recording data in and/or reproducing data from an optical disk, said optical disk including a recording area divided into a plurality of sectors each having a header information part, each header information part including a plurality of header regions each including an address region for holding address information and an address error detection region for holding an address error detection code for detecting an error in the corresponding address information, said method comprising:

detecting a header information part corresponding to a sector of said optical disk;

reading address information and an address error detection code from each of a plurality of header regions in the detected header information part;

judging for each of said plurality of header regions whether said address error detection code indicates an error in the corresponding address information;

determining a number of errors for said detected header information part; and changing said state of said optical disk device, based on said number of errors in said detected header information part, to a higher state or a lower state.

14. The method according to claim 13, wherein said state of said optical disk device represents the degree to which said optical disk device can accurately read said header information part.

15. The method according to claim 13, further comprising:

selectively prohibiting said optical disk device from recording to or reproducing information from a sector of said optical disk in accordance with said state.

16. The method according to claim 13, wherein said changing step changes said state of said optical disk device to a higher state when said number of errors is not more than a predetermined value and changes said state of said optical disk device to a lower state when said number of errors is more than said predetermined value.

17. The method according to claim 13, wherein optical disk device detects header regions using a first header detection window or a second header detection window, depending on said state of said optical disk device.

* * * * *